US011197093B2

United States Patent
Terashima et al.

(10) Patent No.: US 11,197,093 B2
(45) Date of Patent: Dec. 7, 2021

(54) ECHO SUPPRESSION DEVICE, ECHO SUPPRESSION METHOD, AND NON-TRANSITORY COMPUTER-READABLE RECORDING MEDIUM WHICH RECORDS ECHO SUPPRESSION PROGRAM

(71) Applicant: Panasonic Intellectual Property Corporation of America, Torrance, CA (US)

(72) Inventors: Yuki Terashima, Osaka (JP); Shinichi Yuzuriha, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/091,768

(22) Filed: Nov. 6, 2020

(65) Prior Publication Data

US 2021/0144472 A1    May 13, 2021

Related U.S. Application Data

(60) Provisional application No. 62/934,119, filed on Nov. 12, 2019.

(30) Foreign Application Priority Data

May 20, 2020  (JP) .............................. JP2020-087944

(51) Int. Cl.
  *H04R 3/02*  (2006.01)
  *H04M 3/00*  (2006.01)

(52) U.S. Cl.
  CPC .............. *H04R 3/02* (2013.01); *H04M 3/002* (2013.01)

(58) Field of Classification Search
  CPC ................................. H04R 3/02; H04M 3/002
  See application file for complete search history.

(56) References Cited

U.S. PATENT DOCUMENTS

| 2003/0031315 A1 | 2/2003 | Belt et al. |
| 2014/0079232 A1* | 3/2014 | Houshuyama ...... G10L 21/0208 381/66 |

(Continued)

FOREIGN PATENT DOCUMENTS

| JP | 2010-103875 | 5/2010 |
| JP | 2017-191992 | 10/2017 |

OTHER PUBLICATIONS

Extended European Search Report (EESR), dated May 4, 2021 by the European Patent Office (EPO), for the corresponding European Patent Application No. 20203965.7.

(Continued)

*Primary Examiner* — Andrew L Sniezek
(74) *Attorney, Agent, or Firm* — Greenblum & Bernstein, P.L.C.

(57) ABSTRACT

An echo suppression device includes an echo canceller which suppresses a linear echo signal from an input signal acquired by a microphone; a nonlinear echo estimation unit which, by using a nonlinear echo model indicative of a relationship between at least one of a call reception signal to be output to a speaker and the input signal, and a nonlinear echo signal, estimates the nonlinear echo signal included in the input signal from at least one of the call reception signal and the input signal; a nonlinear echo suppression unit which, by using the estimated nonlinear echo signal, suppresses the nonlinear echo signal from an output signal of the echo canceller; and an echo suppressor which suppresses a residual linear echo signal not suppressed by the echo canceller from an output signal of the nonlinear echo suppression unit.

14 Claims, 19 Drawing Sheets

(56) References Cited

U.S. PATENT DOCUMENTS

2018/0367674 A1* 12/2018 Schalk-Schupp ..............................
  G10L 21/0264
2019/0222691 A1*  7/2019 Shah ................... G10L 21/0208

OTHER PUBLICATIONS

Ingo Schalk-Schupp et al., "Approximation of a Nonlinear Distortion Function for Combined Linear and Nonlinear Residual Echo Suppression", 2016 IEEE International Workshop on Acoustic Signal Enhancement (IWAENC), IEEE, pp. 1-5, XP032983160, Sep. 13, 2016.

* cited by examiner

FIG.13
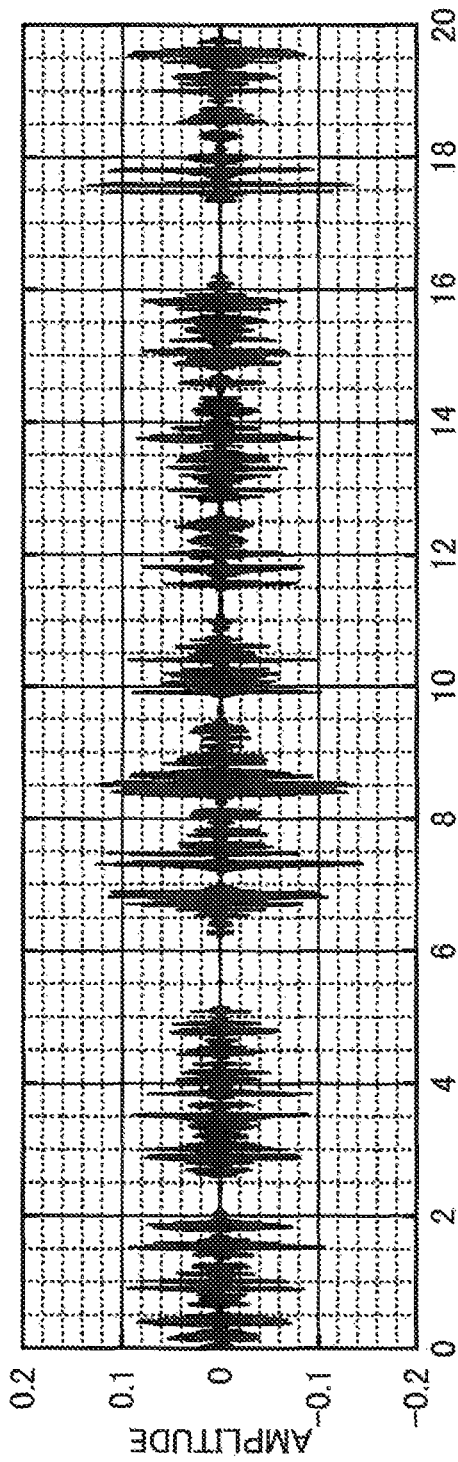
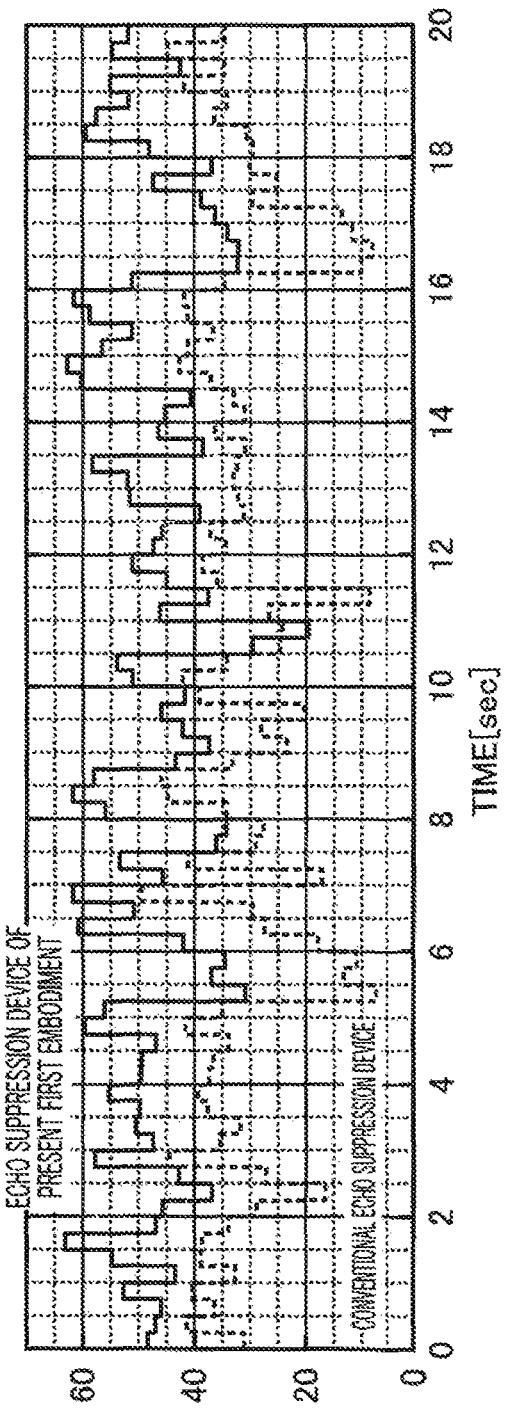

ECHO SUPPRESSION DEVICE, ECHO SUPPRESSION METHOD, AND NON-TRANSITORY COMPUTER-READABLE RECORDING MEDIUM WHICH RECORDS ECHO SUPPRESSION PROGRAM

FIELD OF THE INVENTION

The present disclosure relates to a technique for suppressing a linear echo signal and a nonlinear echo signal included in an input signal acquired by a microphone.

BACKGROUND ART

In a ease where a loud voice call using a speaker and a microphone is made in a hands-free call system, a video conference system, or the like, voice uttered by a caller on a call transmission side is input to a microphone on the call transmission side and is transmitted as a call transmission signal to an apparatus on a call reception side via a network line. The loudspoken voice from a speaker on the call reception side is collected by a microphone on the call reception side and transmitted to an apparatus on the call transmission side via the network line. At this time, voice uttered by the caller after a lapse of time of passing through the network line and a lapse of time of propagation through a space on the call reception side is reproduced from a speaker on the call transmission side. Thus, voice propagated between the speaker and the microphone on the call reception side is called echo and hinders the call. Under these circumstances, echo suppression techniques have been proposed such, as an echo canceller, an echo suppressor, and the like.

For example, in the echo suppressor disclosed in JP 2017-191992 A, in a case where at the reproduction of a call reception signal by a speaker, if a reproduced sound might be distorted due to high level of the call reception signal, a gain baying a larger suppression amount than a gain that would be used if no distortion was generated is obtained for each frequency and a value based on a sound collection signal in a frequency domain is multiplied by the obtained gain.

Additionally, for example, in the echo suppression apparatus disclosed in JP2010-103875 A, when a power of a reproduction signal having any frequency value is greater than a predetermined threshold, in the case of a frequency value being an m-fold frequency value (m=2, 3, . . . , M) or around the m-fold frequency value, a value is obtained as a second gain coefficient, the value being obtained by making a gain coefficient corresponding to the m-fold frequency value and the frequency value around the m-fold frequency value closer to 0, and if not, the gain coefficient is obtained as the second gain coefficient.

However, the above-described conventional technique has difficulty in stably suppressing a nonlinear echo signal included in an input signal acquired by a microphone and therefore requires further improvement.

SUMMARY OF THE INVENTION

The present disclosure has been made to solve the above-described problem, and an object thereof is to provide a technique for stably suppressing a nonlinear echo signal included in an input signal acquired by a microphone.

An echo suppression device according to one aspect of the present disclosure is provided with a first linear echo suppression unit which estimates an amplitude component and a phase component of a linear echo signal included in an input signal acquired by a microphone, to suppress the linear echo signal from the input signal; a nonlinear echo estimation unit which, by using a nonlinear echo model indicative of a relationship between at least one of a call reception signal to be output to a speaker and the input signal, and a nonlinear echo signal, estimates the nonlinear echo signal included in the input signal from at least one of the call reception signal and the input signal; a nonlinear echo suppression unit which, by using the nonlinear echo signal estimated by the nonlinear echo estimation unit, suppresses the nonlinear echo signal from an output signal of the first linear echo suppression unit; and a second linear echo suppression unit which estimates an amplitude component of a residual linear echo signal not suppressed by the first linear echo suppression unit, to suppress the residual linear echo signal from an output signal of the nonlinear echo suppression unit.

BRIEF DESCRIPTION OF THE DRAWINGS

FIG. 13 is a diagram showing, a temporal change of an amplitude of an input signal including a male voice and a temporal change of an echo suppression amount (ERLE) with respect to the input signal;

Figure 1:
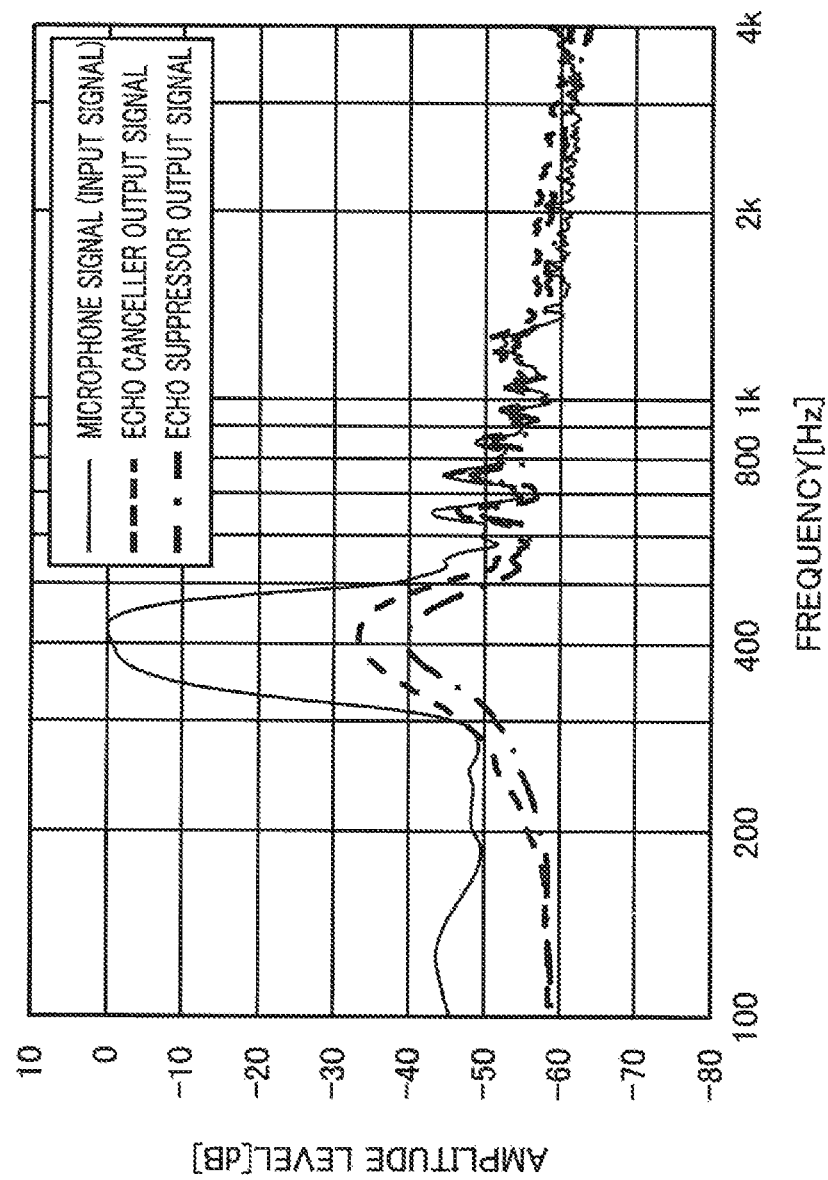
FIG. 1 is a diagram showing a microphone signal, an echo canceller output signal, and an echo suppressor output signal in a case where a nonlinear echo caused by a speaker distortion is not included in an input signal.

DESCRIPTION OF EMBODIMENTS (Knowledge Underlying Present Disclosure)

An echo canceller is a technique of removing echoes by estimating an echo signal by an adaptive filter and subtracting the estimated echo signal from a signal of sound collected by a microphone. An echo is an overlap of a direct sound and a reflected sound of a loudspoken sound from a speaker. Therefore, a transmission characteristic between the speaker and the microphone can be represented by an FIR (Finite Impulse Response) filter. An FIR type the adaptive filter learns so as to approximate a transmission characteristic and convolutes a filtering coefficient in a call reception signal to generate a pseudo echo signal as an estimation value of an echo. As a learning algorithm for an adaptive filter, there have been proposed a LMS (Least Mean Square) method, an NLMS (Normalized LMS) method, a method based on ICA (Independent Component Analysis), and the like.

By contrast, an echo suppressor is a technique for suppressing an echo by estimating a power spectrum of an echo in a frequency domain and subtracting the estimated power spectrum of the echo from a signal of sound collected by a microphone. An echo suppressor suppresses echoes by, for example, the spectrum subtraction method or the Wiener filtering method. In the above-described echo canceller, a residual echo might be generated immediately after power application or when an echo path changes because learning of an adaptive filter takes time. Additionally, noise or a call transmission signal generated in a speaker or a microphone causes erroneous learning of the adaptive filter to generate a pseudo echo signal estimation error, so that the residual echo might be increased. An echo suppressor is therefore commonly used for compensating for echo suppression at a later stage of an echo canceller.

Conventional echo cancellers and conventional echo suppressors have a problem that it is difficult to suppress a nonlinear echo to which a nonlinear noise such as a speaker distortion is applied because of estimation of an echo based on a linear model. With an apparatus for use in a notebook computer or a portable Web conference system, an effect of a nonlinear echo derived from a speaker distortion noticeably appears, so that a call might not be made comfortably because a loudspoken sound is made at high volume by a small-scale speaker.

In JP 2017-191992 A described above, it is difficult to suppress a nonlinear echo signal of a frequency component not included in a call reception signal, such as a harmonic distortion.

Additionally, in JP 2010-103875 A described above, it is difficult to suppress a wide band distortion component and difficult to suppress a distortion component generated at a frequency value other than, an integral-multiple frequency value.

In order to solve the foregoing problems, an echo suppression device according to one aspect of the present disclosure is provided with a first linear echo suppression unit which estimates an amplitude component and a phase component of a linear echo signal included in an input signal acquired by a microphone, to suppress the linear echo signal from the input signal; a nonlinear echo estimation unit which, by using a nonlinear echo model indicative of a relationship between at least one of a call reception signal to be output to a speaker and the input signal, and a nonlinear echo signal, estimates the nonlinear echo signal included in the input signal from at least one of the call reception signal and the input signal; a nonlinear echo suppression unit which, by using the nonlinear echo signal estimated by the nonlinear echo estimation unit, suppresses the nonlinear echo signal from an output signal of the first linear echo suppression unit; and a second linear echo suppression unit which estimates an amplitude component of a residual linear echo signal not suppressed by the first linear echo suppression unit, to suppress the residual linear echo signal from an output signal of the nonlinear echo suppression unit.

According to this configuration, by using a nonlinear echo model indicative of a relationship between at least one of a call reception signal to be output to the speaker and an input signal, and a nonlinear echo signal, the nonlinear echo signal included in the input signal is estimated from at least one of the call reception signal and the input signal, and by using the estimated nonlinear echo signal, the nonlinear echo signal is suppressed from an output signal of the first linear echo suppression unit. Accordingly, the nonlinear echo signal included in the input signal acquired by the microphone can be stably suppressed.

Additionally, a residual linear echo signal is suppressed by the second linear echo suppression unit from an output signal in which a nonlinear echo signal is suppressed. Accordingly, it is possible to stabilize operation of the second linear echo suppression unit and improve linear echo signal suppression performance.

Also, in the above-described echo suppression device, the nonlinear echo model may be learned with at least one of the call reception signal and the input signal as an input and the nonlinear echo signal as an output, the nonlinear echo model using, as teacher data, at least one of the call reception signal and the input signal, and an output signal of the second linear echo suppression unit which suppresses the residual linear echo signal from an output signal of the first linear echo suppression unit which suppresses a linear echo signal from the input signal.

According to this configuration, since the first linear echo suppression unit and the second linear echo suppression unit suppress only a linear echo signal and do not suppress a nonlinear echo signal, a signal with a linear echo signal suppressed by the first linear echo suppression unit and the second linear echo suppression unit can be used as a nonlinear echo signal for teacher data.

Additionally, since a nonlinear echo signal is learned with at least one of a call reception signal and an input signal, and an output signal of the second linear echo suppression unit used as teacher data, a complicated distortion by a speaker can be precisely modeled to improve an estimation precision of a nonlinear echo signal.

Also in the above-described echo suppression device, the nonlinear echo model may be a neural network.

According to this configuration, a nonlinear echo model can be realized by a neural network.

Additionally, in the above-described echo suppression device, the nonlinear echo estimation unit may estimate the nonlinear echo signal included in the input signal from the call reception signal by using the nonlinear echo model indicative of a relationship between the call reception signal and the nonlinear echo signal.

According to this configuration, since a nonlinear echo signal can be estimated from a call reception signal by using a nonlinear echo model indicative of a relationship between the call reception signal and the nonlinear echo signal, a nonlinear echo signal can be easily estimated from a call reception signal.

Additionally, in the above-described echo suppression device, the nonlinear echo estimation unit may estimate the nonlinear echo signal included in the input signal from the call reception signal and the input signal by using the nonlinear echo model indicative of a relationship between the call reception signal and the input signal, and the nonlinear echo signal.

According to this configuration, since a nonlinear echo signal is estimated not only from a call reception signal but also from a call reception signal and an input signal, an estimation precision of a nonlinear echo signal can be improved.

Additionally, in the above-described echo suppression device, the nonlinear echo estimation unit may estimate the nonlinear echo signal included in the input signal from the call reception signal and an output signal of the first linear echo suppression unit by using the nonlinear echo model indicative of a relationship between the call reception signal and an output signal of the first linear echo suppression unit, and the nonlinear echo signal.

According to this configuration, since a nonlinear echo signal is estimated not only from a call reception signal but also from a call reception signal and an output signal of the first linear echo suppression unit, an estimation precision of a nonlinear echo signal can be improved.

Additionally, in the above-described echo suppression, device, the first linear echo suppression unit may include an adaptive filter which generates a pseudo linear echo signal indicative of a component of the call reception signal included in the input signal by convoluting a filtering coefficient and the call reception signal, and a subtraction unit which subtracts the pseudo linear echo signal from the input signal, and the nonlinear echo estimation unit may estimate the nonlinear echo signal included in the input signal from the call reception signal and the pseudo linear echo signal from the adaptive filter by using the nonlinear echo model indicative of a relationship between the call reception signal and the pseudo linear echo signal from the adaptive filter, and the nonlinear echo signal.

According to this configuration, since a nonlinear echo signal is estimated not only from a call reception signal but also from a call reception signal and a pseudo linear echo signal from the adaptive filter of the first linear echo suppression unit, an estimation precision of a nonlinear echo signal can be improved.

Additionally, in the above-described echo suppression device, the nonlinear echo estimation unit may estimate the nonlinear echo signal included in the input signal from the input signal by using the nonlinear echo model indicative of a relationship between the input signal and the nonlinear echo signal.

According to this configuration, since a nonlinear echo signal is estimated from an input signal using a nonlinear echo model indicative of a relationship between an input signal and a nonlinear echo signal, a nonlinear echo signal can be easily estimated from an input signal.

Additionally, the above-described echo suppression device may be further provided with a correction unit which calculates a variable gain for minimizing one of an output signal of the nonlinear echo suppression unit and an output signal of the second linear echo suppression unit and corrects the nonlinear echo signal estimated by the nonlinear echo estimation unit by using the calculated variable gain.

According to this configuration, a nonlinear echo signal estimation error can be corrected to improve nonlinear echo signal suppression performance.

An echo suppression device according to another aspect of the present disclosure includes a first linear echo suppression unit which estimates an amplitude component and a phase component of a linear echo signal included in an input signal acquired by a microphone, to suppress the linear echo signal from the input signal; a nonlinear echo estimation unit which estimates the nonlinear echo signal included in the input signal from at least one of a call reception signal to be output to a speaker and the input signal; a nonlinear echo suppression unit which, by using the nonlinear echo signal estimated by the nonlinear echo estimation unit, suppresses the nonlinear echo signal from the input signal; and a second linear echo suppression unit which estimates an amplitude component of a residual linear echo signal not suppressed by the first linear echo suppression unit, to suppress the residual linear echo signal.

According to this configuration, a nonlinear echo signal included in an input signal is estimated from at least one of a call reception signal to be output to the speaker and the input signal, and by using the estimated nonlinear echo signal, the nonlinear echo signal is suppressed from the input signal. Accordingly, a nonlinear echo signal included in an input signal acquired by the microphone can be stably suppressed.

Additionally, a residual linear echo signal is suppressed by the second linear echo suppression unit. Accordingly, operation of the second linear echo suppression unit can be stabilized to improve linear echo signal suppression performance.

An echo suppression method according to still another aspect of the present disclosure includes, estimating, by a first linear echo suppression unit, an amplitude component and a phase component of a linear echo signal included in an input signal acquired by a microphone, to suppress the linear echo signal from the input signal; by using a nonlinear echo model indicative of a relationship between at least one of a call reception signal to be output to a speaker and the input signal, and a nonlinear echo signal, estimating, by a nonlinear echo estimation unit, the nonlinear echo signal included in the input signal from at least one of the call reception signal and the input signal; by using, the nonlinear echo signal estimated by the nonlinear echo estimation unit, suppressing, by a nonlinear echo suppression unit, the nonlinear echo signal from an output signal of the first linear echo suppression unit; and estimating, by a second linear echo suppression unit, an amplitude component of a residual linear echo signal not suppressed by the first linear echo suppression unit, to suppress the residual linear echo signal from an output signal of the nonlinear echo suppression unit.

According to this configuration, by using, a nonlinear echo model indicative of a relationship between at least one of a call reception signal to be output to the speaker and an input signal, and the nonlinear echo signal, a nonlinear echo signal included in the input signal is estimated from at least one of the call reception signal and the input signal, and by using the estimated nonlinear echo signal, the nonlinear echo signal is suppressed from an output signal of the first linear echo suppression unit. Accordingly, it is possible to stably suppress a nonlinear echo signal included in an input signal acquired by the microphone.

Additionally, a residual linear echo signal is suppressed by the second linear echo suppression unit from an output signal in which a nonlinear echo signal is suppressed. Accordingly, operation of the second linear echo suppression unit can be stabilized to improve linear echo signal suppression performance.

An echo suppression method according to yet another aspect of the present disclosure includes, estimating, by a first linear echo suppression unit, an amplitude component and a phase component of a linear echo signal included in an input signal acquired by a microphone, to suppress the linear echo signal from the input signal; estimating, by a nonlinear echo estimation unit, the nonlinear echo signal included in the input signal from at least one of a call reception signal to be output to a speaker and the input signal; by using the nonlinear echo signal estimated by the nonlinear echo estimation unit, suppressing, by a nonlinear echo suppression unit, the nonlinear echo signal from the input signal; and estimating, by a second linear echo suppression unit, an amplitude component of a residual linear echo signal not suppressed by the first linear echo suppression unit, to suppress the residual linear echo signal.

According to this configuration, a nonlinear echo signal included in an input signal is estimated from at least one of a call reception signal to be output to the speaker and the input signal, and by using the estimated nonlinear echo signal, the nonlinear echo signal is suppressed from the input signal. Accordingly, it is possible to stably suppress a nonlinear echo signal included in an input signal acquired by the microphone.

Additionally a residual linear echo signal is suppressed by the second linear echo suppression unit. Accordingly, operation of the second linear echo suppression unit can be stabilized to improve linear echo signal suppression performance.

In a non-transitory computer-readable recording medium which records an echo suppression program according to yet another aspect of the present disclosure, the program causes a computer to function as: a first linear echo suppression unit which estimates an amplitude component and a phase component of a linear echo signal included in an input signal acquired by a microphone, to suppress the linear echo signal from the input signal; a nonlinear echo estimation unit which, by using a nonlinear echo model indicative of a relationship between at least one of a call reception signal to be output to a speaker and the input signal, and a nonlinear echo signal, estimates the nonlinear echo signal included in the input signal from at least one of the call reception signal and the input signal; a nonlinear echo suppression unit which, by using the nonlinear echo signal estimated by the nonlinear echo estimation unit, suppresses the nonlinear echo signal from an output signal of the first linear echo suppression unit; and a second linear echo suppression unit which estimates an amplitude component of a residual linear echo signal not suppressed by the first linear echo suppression unit, to suppress the residual linear echo signal from an output signal of the nonlinear echo suppression unit.

According to this configuration, by using a nonlinear echo model indicative of a relationship between at least one of a call reception signal to be output to the speaker and an input signal, and a nonlinear echo signal, the nonlinear echo signal included in the input signal is estimated from at least one of the call reception signal and the input signal, and by using the estimated nonlinear echo signal, the nonlinear echo signal is suppressed from an output signal of the first linear echo suppression unit. Accordingly, a nonlinear echo signal included in an input signal acquired by the microphone can be stably suppressed.

Additionally, a residual linear echo signal is suppressed by the second linear echo suppression unit from an output signal in which a nonlinear echo signal is suppressed. Accordingly, operation of the second linear echo suppression unit can be stabilized to improve linear echo signal suppression performance.

In a non-transitory computer-readable recording medium which records an echo suppression program according to still another aspect of the present disclosure, the program causes a computer to function as: a first linear echo suppression unit which estimates an amplitude component and a phase component of a linear echo signal included in an input signal acquired by a microphone, to suppress the linear echo signal from the input signal; a nonlinear echo estimation unit which estimates the nonlinear echo signal included in the input signal from at least one of a call reception signal to be output to a speaker and the input signal; a nonlinear echo suppression unit which, by using the nonlinear echo signal estimated by the nonlinear echo estimation unit, suppresses the nonlinear echo signal from the input signal; and a second linear echo suppression unit which estimates an amplitude component of a residual linear echo signal not suppressed by the first linear echo suppression unit, to suppress the residual linear echo signal.

According to this configuration, a nonlinear echo signal included in an input signal is estimated from at least one of a call reception signal to be output to the speaker and the input signal, and by using the estimated nonlinear echo signal, the nonlinear echo signal is suppressed from the input signal. Accordingly, it is possible to stably suppress a nonlinear echo signal included in an input signal acquired by the microphone.

Additionally, a residual linear echo signal is suppressed by the second linear echo suppression unit. Accordingly, operation of the second linear echo suppression unit can be stabilized to improve linear echo signal suppression performance.

In the following, embodiments of the present disclosure will be described with reference to the accompanying drawings. The embodiments below are one examples implementing the present disclosure and do not limit the technical range of the present disclosure.

First Embodiment

First, nonlinear echo generation factors will be described.

Nonlinear distortion is a generic name of distortion occurring in a ease where a system input/output relationship is not proportional. For example, when two tone sine waves of frequencies f1 and f2 are input to a system having an input/output characteristic that an output amplitude clips as an input amplitude is increased, an amplitude spectrum of an output waveform will have nonlinear distortions in frequency components not present in an input signal. The nonlinear distortions are roughly classified into a harmonic distortion occurring at integral multiple frequencies of the input signal such as 2f1 and 2f2 and an intermodulation distortion occurring at frequencies as a sum and a difference in the input signal such as f1+f2 and f2−f1.

In an actual system, a nonlinear distortion of a loudspoken sound from a speaker becomes a factor for a nonlinear echo. In a common electrodynamic speaker widely used, displacement of a diaphragm is increased in a frequency band near a lowest resonance frequency f0. Then, a nonlinear distortion is generated by nonlinearity of a driving force generated by moving of a voice coil over a range of a magnetic flux made by a permanent magnet, or by mechanical nonlinearity of a supporting system such as a cone edge or a damper, or by other nonlinearity. Further, in a small-scale speaker, a sound pressure near the lowest resonance frequency f0 is boosted by preprocessing for compensating for a reduction in a sound pressure level in a low frequency band in some cases. In this case, a diaphragm is displaced more to become a factor for further generation of a nonlinear distortion.

Subsequently, effects of a nonlinear echo exerted on a conventional echo suppression technique will be described. As a conventional echo suppression technique, a system provided with an echo canceller and an echo suppressor will be described.

An echo canceller removes echoes by calculating an echo estimation value, i.e., a pseudo echo signal, by an adaptive filter and subtracting the calculated pseudo echo signal from a microphone signal. Specifically, assuming a call reception signal to be represented as x(k), a coefficient of the adaptive filter as $w_n(k)$, and the number of taps of the adaptive filter as N, a pseudo echo y(k) will be represented by an equation (1) below.

$$y(k) = \sum_{n=0}^{N-1} w_n(k)x(k-n) \quad (1)$$

The equation (1) indicates that a pseudo echo is expressed by a linear sum including changed phase and amplitude of a call reception signal, and cannot express a nonlinear echo irrespective of an adaptive algorithm used in coefficient learning.

Additionally, an echo suppressor is provided at a later stage of an echo canceller. The echo suppressor suppresses a residual echo by estimating a power spectrum of a residual echo not suppressed by the echo canceller. An echo suppressor based on the Wiener filtering method widely used in common estimates an acoustic coupling amount $A_E(\omega)$ between a short time spectrum $X(\omega)$ of a call reception signal and a short-time spectrum $Y_{EC}(\omega)$ of a residual echo to calculate a Wiener filter $G_{wiener}(\omega)$ based on an equation (2) below:

$$G_{wiener}(\omega) = \frac{|Y_{EC}(\omega)|^2 - |A_e(\omega)X(\omega)|^2}{|Y_{EC}(\omega)|^2} \quad (2)$$

Then, the echo suppressor obtains a signal $Y_{ES}(\omega)$ with suppressed echoes by multiplying the short-time spectrum $Y_{EC}(\omega)$ of the residual echo by the Wiener filter $G_{wiener}(\omega)$ in a manner shown by an equation (3) below.

$$Y_{ES}(\omega) = G_{wiener}(\omega)Y_{EC}(\omega) \quad (3)$$

In other words, the echo suppressor estimates a residual echo by the acoustic coupling amount $A_E(\omega)$ estimated for each frequency component and the call reception signal $X(\omega)$. Therefore, the echo suppressor cannot estimate a frequency component absent in a call reception signal, such as a nonlinear echo.

As a support of the above description, experiment for checking evaluation of effects of a nonlinear echo, was performed by the inventors. For the evaluation experiment, a conventional echo suppression device was used. A conventional echo suppression device is provided with a speaker which loudspeaks a call reception signal, a microphone, an echo canceller which suppresses an echo signal from an input signal acquired by the microphone, and an echo suppressor which suppresses an echo signal from an output signal of the echo canceller. For the evaluation, there was used a ⅓ octave band noise at a center frequency of 400 Hz near the lowest resonance frequency f0 of the speaker used in loudspeaking.

Figure 2:
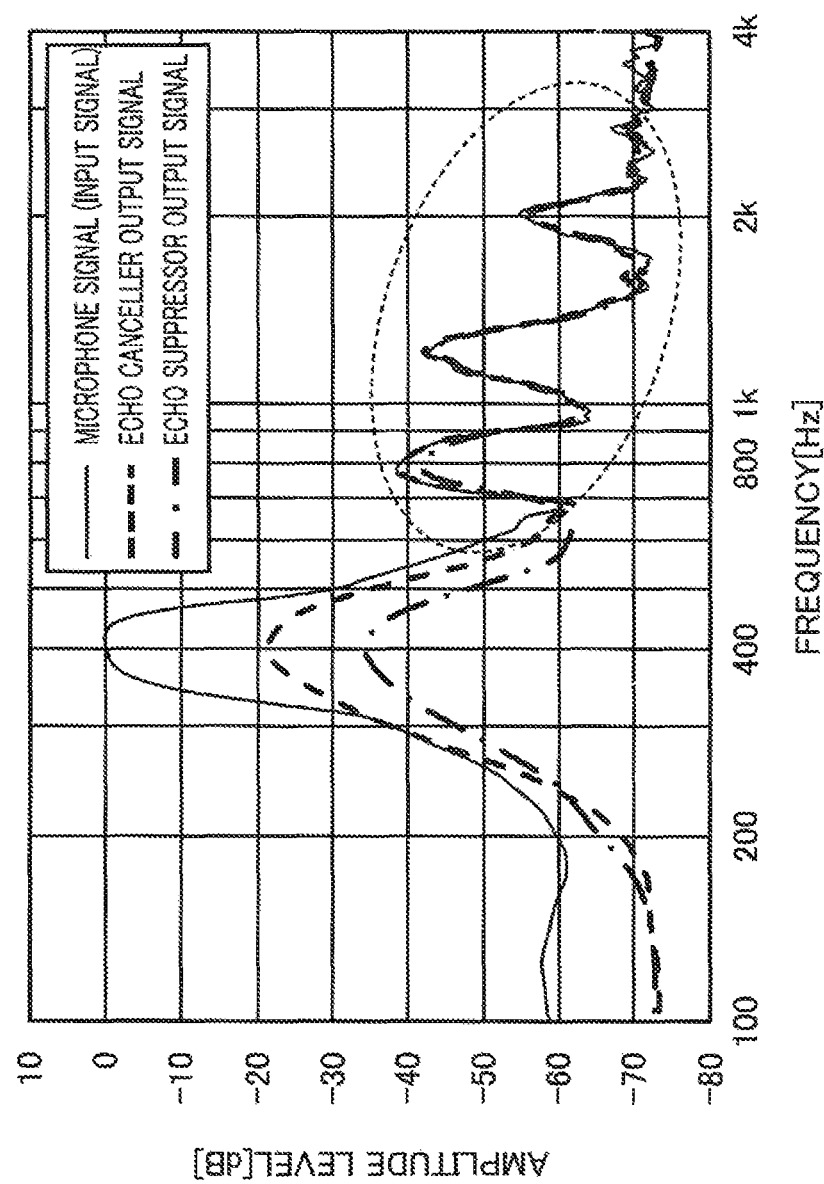
FIG. 2 is a diagram showing a microphone signal, an echo canceller output signal, and an echo suppressor output signal in a case where a nonlinear echo caused by a speaker distortion is included in an input signal.

FIG. 1 is a diagram showing a microphone signal, an echo canceller output signal, and an echo suppressor output signal in a case where a nonlinear echo caused by a speaker distortion is not included in art input signal, and FIG. 2 is a diagram showing a microphone signal, an echo canceller output signal, and an echo suppressor output signal in a case where a nonlinear echo caused by a speaker distortion is included in an input signal.

In FIG. 1 and FIG. 2, solid lines represent a microphone signal (input signal) output from a microphone, broken lines represent an echo canceller output signal, and chain dotted lines represent an echo suppressor output signal. In FIG. 1 and FIG. 2, the horizontal axes represent a frequency and the vertical axes represent an amplitude level.

In FIG. 2, secondary to quartic harmonics of an input signal appear, which shows that no nonlinear echoes can be suppressed at all by conventional echo canceller and echo suppressor as described above. Further, focusing on a fundamental tone near 400 Hz in FIG. 1 and FIG. 2, it is found that while without a nonlinear echo, echoes of about 35 dB are suppressed by the echo canceller, with a nonlinear echo, the suppression amount realized by the echo canceller is decreased to about 20 dB. This is considered to be derived from an error in echo estimation due to erroneous learning caused as a result of forcible updating of a filter coefficient continuously conducted by an adaptive filter for trying to imitate a nonlinear echo which cannot be originally expressed.

An essential problem of a conventional echo suppression technique is that nonlinear echoes cannot be expressed because echoes are estimated based on a linear model. In the present first embodiment, therefore, an echo suppression device estimates nonlinear echoes by using a neural network which enables approximation of an arbitrary nonlinear function. As a neural network introducing method, there are two possible methods, a method of estimating an amplitude and a phase of a nonlinear echo and applying the estimated results to an echo canceller and a method of estimating only an amplitude of a nonlinear echo and applying the estimated result to an echo suppressor. The former method has problems of requiring higher estimation precision than in the latter and of an increase in a calculation amount. The echo suppression device of the present first embodiment therefore realizes suppression of nonlinear echoes by an echo suppressor method which can be implemented with low power consumption, low cost, and a reduced calculation amount.

Figure 3:
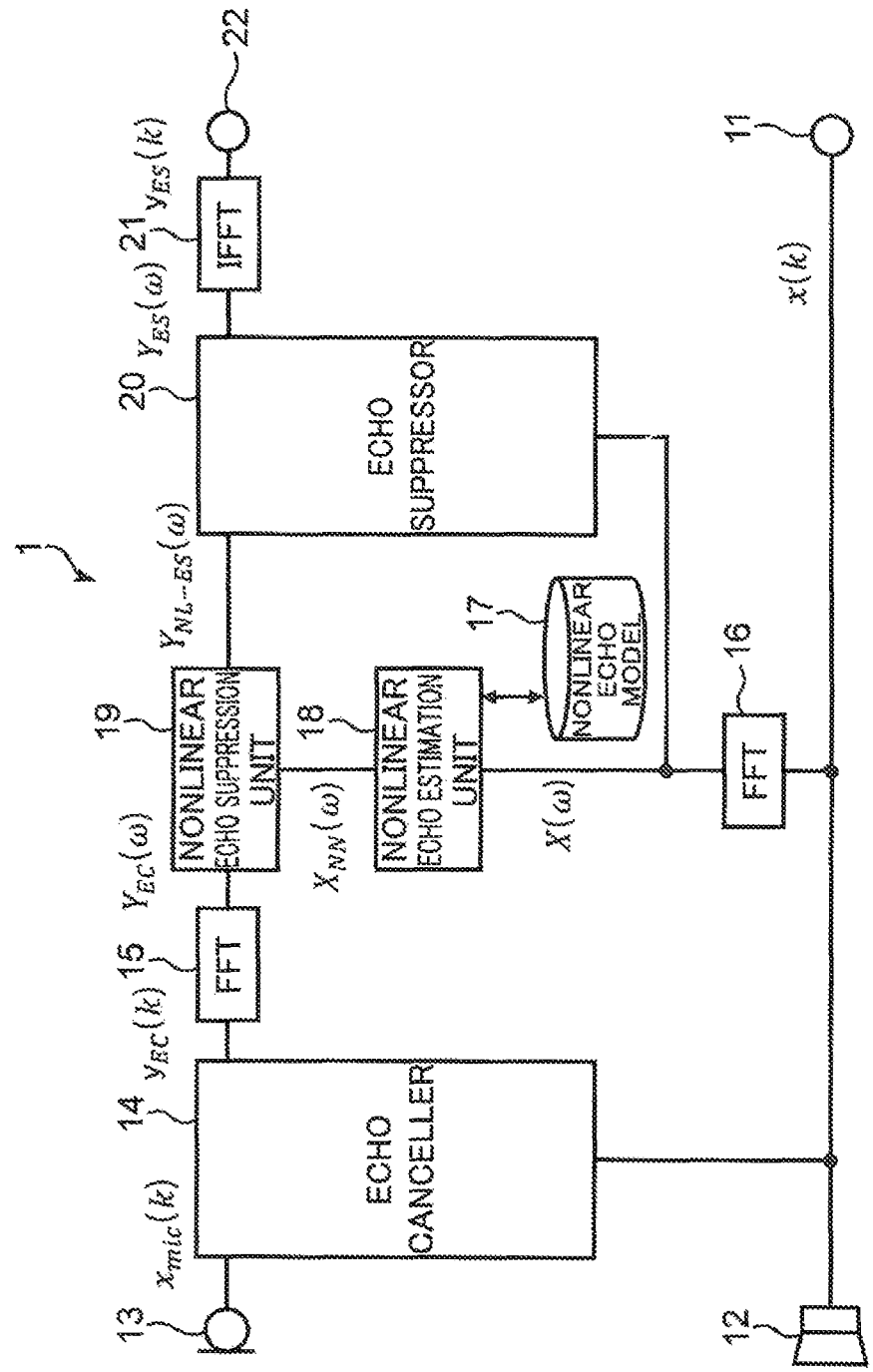
FIG. 3 is a diagram showing a configuration of a call device in a first embodiment of the present disclosure.
Figure 4:
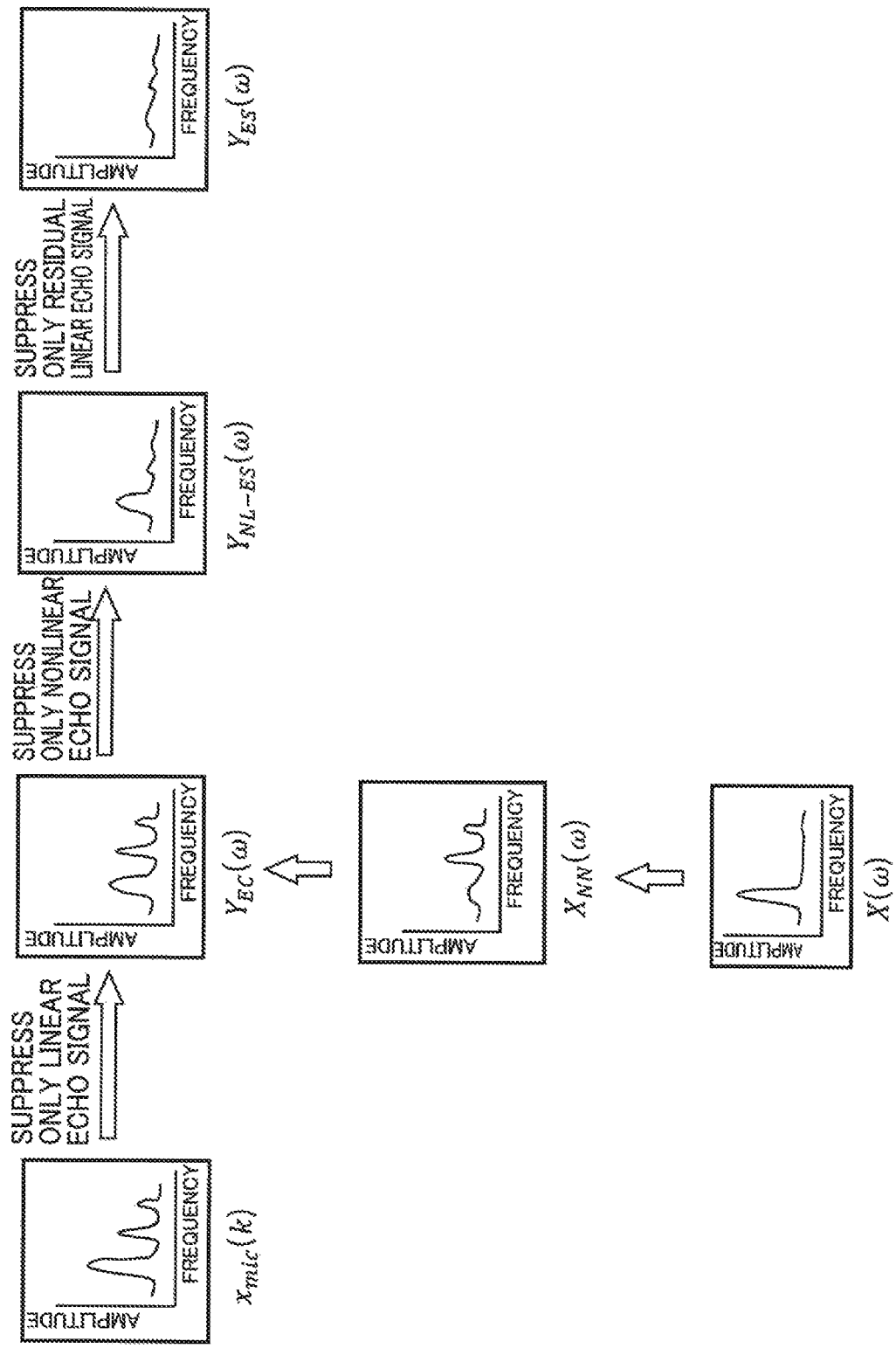
FIG. 4 is a diagram showing one example of a signal to be output from each unit of an echo suppression device in the present first embodiment.

FIG. 3 is a diagram showing a configuration of a call device in a first embodiment of the present disclosure. FIG. 4 is a diagram showing one example of a signal to be output from each unit of an echo suppression device in the present first embodiment. The call device is used in a loudspeaker type hands-free call system, a loudspeaker type bidirectional communication conference system, an interphone system, and the like.

The call device shown in FIG. 3 is provided with an echo suppression device 1, an input terminal 11, a speaker 12, a microphone 13, and an output terminal 22.

The input terminal 11 outputs a call reception signal x(k) received from a call device (not shown) on a call reception side to the echo suppression device 1.

The speaker 12 externally outputs the input call reception signal x(k). Here, in a case where a voice output from the speaker 12 is collected by the microphone 13, a voice uttered by a caller on the call reception side will be reproduced behindhand from a speaker on the call reception side to generate a so-called echo. The echo suppression device 1 therefore suppresses an acoustic echo signal included in an input signal $x_{mic}(k)$ output from the microphone 13. At this time, the acoustic echo signal includes a linear echo signal and a nonlinear echo signal.

The microphone 13 is arranged in a space in which a call transmission party is present, and collects a voice of the call transmission party. The microphone 13 outputs the input signal $x_{mic}(k)$ indicative of the collected voice to the echo suppression device 1.

The output terminal 22 outputs an input signal $y_{ES}(k)$ with a linear echo signal and a nonlinear echo signal suppressed by the echo suppression device 1.

The input terminal 11 and the output terminal 22 are connected to a communication unit (not shown). The communication unit transmits the input signal $y_{ES}(k)$ to the call device (not shown) on the call reception side via a network and receives the call reception signal x(k) from the call device (not shown) on the call reception side via the network. The network is, for example, the Internet.

The echo suppression device 1 is provided with an echo canceller 14, fast Fourier transform units 15 and 16, a nonlinear echo model storage unit 17, a nonlinear echo estimation unit 18, a nonlinear echo suppression unit 19, an echo suppressor 20, and an inverse fast Fourier transform unit 21.

The input terminal 11 outputs the call reception signal x(k) to the speaker 12, the echo canceller 14, and the fast Fourier transform unit 15.

The echo canceller 14 estimates an amplitude component and a phase component of a linear echo signal included in the input signal $x_{mic}(k)$ acquired by the microphone 13 to suppress the linear echo signal from the input signal $x_{mic}(k)$. The echo canceller 14 is one example of a first linear echo suppression unit. As shown in FIG. 4, the echo canceller 14 suppresses only a linear echo signal included in the input signal $x_{mic}(k)$ output from the microphone 13.

The echo canceller 14 is provided with an adaptive filter and a subtraction unit not shown.

The adaptive filter convolutes a filtering coefficient and a call reception signal to generate a pseudo echo signal indicative of a component of a call reception signal included in the input signal $x_{mic}(k)$ acquired by the microphone 13.

The subtraction unit calculates an error signal between the input signal $x_{mic}(k)$ from the microphone 13 and the pseudo echo signal from the adaptive filter and outputs the calculated error signal to the adaptive filter. The adaptive filter corrects the filtering coefficient based on the input error signal and convolutes the corrected filtering coefficient and the call reception signal to generate a pseudo echo signal. The adaptive filter corrects the filtering coefficient bye using an adaptive algorithm so as to have a minimum error signal. As an adaptive algorithm, for example, the Normalized Least Mean Square (NMS) method, the Affine Projection method, or the Recursive Least Square (RLS) method is used.

Additionally, the subtraction unit subtracts the pseudo echo signal of the adaptive filter from the input signal $x_{mic}(k)$ from the microphone 13 to suppress a linear echo signal from the input signal $x_{mic}(k)$. Then, the subtraction unit outputs an input signal $y_{EC}(k)$ with a suppressed linear echo signal to the fast Fourier transform unit 15.

The fast Fourier transform unit 15 conducts discrete Fourier transform at a high speed. The fast Fourier transform unit 15 converts the input signal $y_{EC}(k)$ in a time domain to be input to the nonlinear echo suppression unit 19 from the echo canceller 14 into an input signal $Y_{EC}(\omega)$ in a frequency domain. The fast Fourier transform unit 15 outputs the input signal $Y_{EC}(\omega)$ in the frequency domain with only a linear echo signal suppressed by the echo canceller 14 to the nonlinear echo suppression unit 19.

The fast Fourier transform unit 16 conducts discrete Fourier transform at a high speed. The fast Fourier transform unit 16 converts the call reception signal x(k) in the time domain to be input to the nonlinear echo estimation unit 18 into a call reception signal $X(\omega)$ in the frequency domain. The fast Fourier transform unit 16 outputs the call reception signal $X(\omega)$ in the frequency domain to the nonlinear echo estimation unit 18 and the echo suppressor 20.

The nonlinear echo model storage unit 17 stores in advance a nonlinear echo model indicative of a relationship between at least one of a call reception signal to be output to the speaker 12 and an input signal acquired by the microphone 13, and a nonlinear echo signal. The nonlinear echo model storage unit 17 in the present first embodiment stores in advance a nonlinear echo model indicative of a relationship between a call reception signal and a nonlinear echo signal. The nonlinear echo model is, for example, a neural network.

A nonlinear echo model uses, as teacher data, at least one of a call reception signal and an input signal, and an output signal of the echo suppressor which suppresses a linear echo signal from an output signal of the echo canceller which suppresses a linear echo signal from the input signal, and is learned with at least one of the call reception signal and the input signal as an input and the nonlinear echo signal as an output. The nonlinear echo model in the present first embodiment uses, as teacher data, a call reception signal, and an output signal from the echo suppressor which suppresses a linear echo signal from an output signal of the echo canceller which suppresses a linear echo signal from the input signal, and is learned with the call reception signal as an input and the nonlinear echo signal as an output.

The nonlinear echo estimation unit 18 estimates a nonlinear echo signal $X_{NN}(\omega)$ included in the input signal $Y_{EC}(\omega)$ from at least one of the call reception signal $X(\omega)$ to be output to the speaker 12 and the input signal $x_{mic}(k)$. More specifically, the nonlinear echo estimation unit 18 estimates the nonlinear echo signal $X_{NN}(\omega)$ included in the input signal $Y_{EC}(\omega)$ from at least one of the call reception signal $X(\omega)$ and the input signal $x_{mic}(k)$ by using a nonlinear echo model indicative of a relationship between at least one of the call reception signal $X(\omega)$ to be output to the speaker 12 and the input signal $x_{mic}(k)$, and the nonlinear echo signal. The nonlinear echo estimation unit 18 in the present first embodiment estimates the nonlinear echo signal $X_{NN}(\omega)$ included in the input signal from the call reception signal $X(\omega)$ by using a nonlinear echo model indicative of a relationship between the call reception signal and the nonlinear echo signal.

The nonlinear echo estimation unit 18 reads the nonlinear echo model from the nonlinear echo model storage unit 17. The nonlinear echo estimation unit 18 acquires the nonlinear echo signal $X_{NN}(\omega)$ from the nonlinear echo model by inputting the call reception signal $X(\omega)$ output from the fast Fourier transform unit 16 to the nonlinear echo model. The nonlinear echo estimation unit 18 outputs the nonlinear echo signal $X_{NN}(\omega)$ estimated using the call reception signal $X(\omega)$ to the nonlinear echo suppression unit 19.

The nonlinear echo suppression unit 19 suppresses the nonlinear echo signal $X_{NN}(\omega)$ from the input signal $Y_{EC}(\omega)$ by using the nonlinear echo signal $X_{NN}(\omega)$ estimated by the nonlinear echo estimation unit 18. More specifically, the nonlinear echo suppression unit 19 suppresses the nonlinear echo signal $X_{NN}(\omega)$ from the output signal of the echo canceller 14 by using the nonlinear echo signal $X_{NN}(\omega)$ estimated by the nonlinear echo estimation unit 18.

The nonlinear echo suppression unit 19 calculates a Wiener filter $G_{NN}(\omega)$ from the estimated nonlinear echo signal $X_{NN}(\omega)$ and the input signal $Y_{EC}(\omega)$ from the echo canceller 14 based on; an equation (4) below.

$$G_{NN}(\omega) = \frac{|Y_{EC}(\omega)|^2 - |X_{NN}(\omega)|^2}{|Y_{EC}(\omega)|^2} \quad (4)$$

The nonlinear echo suppression unit 19 obtains an input signal $Y_{NL-ES}(\omega)$ with a suppressed nonlinear echo signal by multiplying the input signal $Y_{EC}(\omega)$ by the Wiener filter $G_{NN}(\omega)$ in a manner as shown in an equation (5) below.

$$Y_{NL-ES}(\omega) = G_{NN}(\omega) Y_{EC}(\omega) \quad (5)$$

The nonlinear echo suppression unit 19 outputs the input signal $Y_{NL-ES}(\omega)$ with only the nonlinear echo signal $X_{NN}(\omega)$ suppressed to the echo suppressor 20.

The echo suppressor 20 suppresses a residual linear echo signal by estimating an amplitude component of a residual linear echo signal not suppressed by the echo canceller 14. More specifically, the echo suppressor 20 suppresses a residual linear echo signal from the output signal $Y_{NL-ES}(\omega)$ of the nonlinear echo suppression unit 19 by estimating an amplitude component of a residual linear echo signal not suppressed by the echo canceller 14. The echo suppressor 20 is one example of a second linear echo suppression unit.

The echo suppressor 20 suppresses a residual linear echo signal by a spectrum subtraction method or the Wiener filtering method. The echo suppressor 20 estimates an acoustic coupling amount for each frequency by using a space including only an echo signal or a coherence function. The echo suppressor 20 calculates a suppression gain by using the estimated acoustic coupling amount and the output signal $Y_{NL-ES}(\omega)$ of the nonlinear echo suppression unit 19, and the call reception signal $X(\omega)$. The echo suppressor 20 suppresses a residual linear echo signal not suppressed by the echo canceller 14 by multiplying the output signal of the nonlinear echo suppression unit 19 by the calculated suppression gain. The echo suppressor 20 outputs the input signal $Y_{ES}(\omega)$ in which only the residual linear echo signal is suppressed from the input signal $Y_{NL-ES}(\omega)$ to the inverse fast Fourier transform unit 21.

The inverse fast Fourier transform unit 21 conducts inverse discrete Fourier transform at a high speed. The inverse fast Fourier transform unit 21 converts the input signal $Y_{ES}(\omega)$ in the frequency domain to be input from the echo suppressor 20 to the output terminal 22 into the input signal $y_{ES}(k)$ in the time domain. The inverse fast Fourier transform unit 21 outputs the input signal $y_{ES}(k)$ to the output terminal 22.

Next, operation of the echo suppression device 1 in the first embodiment of the present disclosure will be described.

Figure 5:
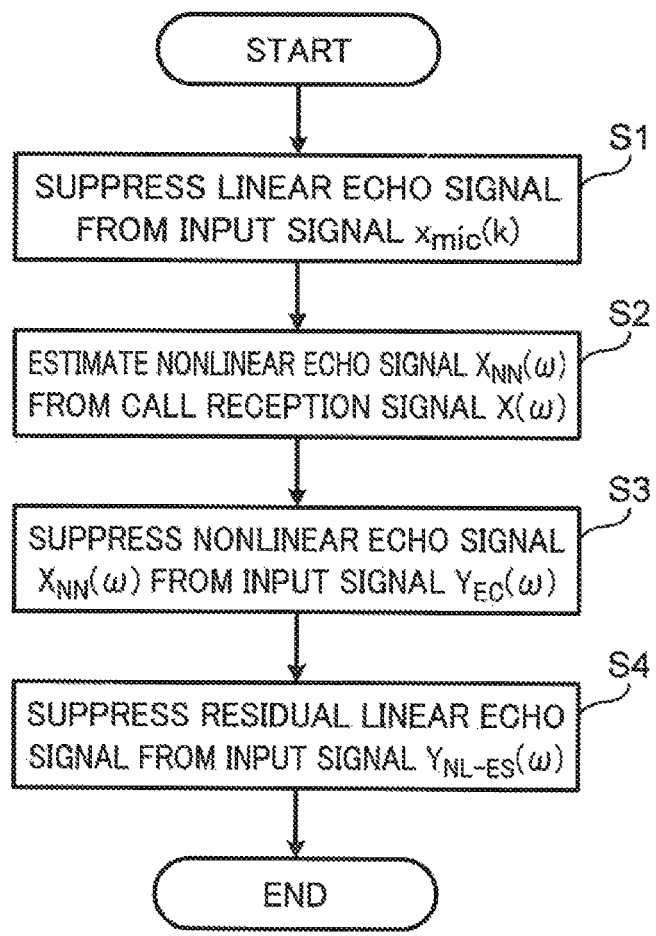
FIG. 5 is a flow chart for describing operation of the echo suppression device in the first embodiment of the present disclosure.

FIG. 5 is a flow chart for describing operation of the echo suppression device in the first embodiment of the present disclosure.

First, in Step S1, the echo canceller 14 suppresses a linear echo signal from the input signal $x_{mic}(k)$ by estimating an amplitude component and a phase component of the linear echo signal included in the input signal $x_{mic}(k)$ acquired by the microphone 13.

Next, in Step S2, the nonlinear echo estimation unit 18 estimates the nonlinear echo signal $X_{NN}(\omega)$ included in the input signal from the call, reception signal $X(\omega)$ by using the nonlinear echo model indicative of a relationship between the call reception signal and the nonlinear echo signal.

Next, in Step S3, the nonlinear echo suppression unit 19 suppresses the nonlinear echo signal $X_{NN}(\omega)$ estimated by the nonlinear echo estimation unit 18 from the input signal $Y_{EC}(\omega)$ output from the echo canceller 14.

Next, in Step S4, the echo suppressor 20 suppresses a residual linear echo signal from the input signal $Y_{NL-ES}(\omega)$ from the nonlinear echo suppression unit 19 by estimating an amplitude component of the residual linear echo signal not suppressed by the echo canceller 14. The echo suppressor 20 outputs the input signal $Y_{ES}(\omega)$ in which only the residual linear echo signal is suppressed from the input signal $Y_{NL-ES}(\omega)$ to the inverse fast Fourier transform unit 21. The inverse fast Fourier transform unit 21 outputs the input signal $y_{ES}(k)$ in the time domain to the output terminal 22.

As described in the foregoing, by using the nonlinear echo model indicative of a relationship between at least one of a call reception signal to be output to the speaker 12 and an input signal, and a nonlinear echo signal, the nonlinear echo signal included in the input signal is estimated from at least one of the call reception signal and the input signal, and by using the estimated nonlinear echo signal, the nonlinear echo signal is suppressed from the output signal of the echo canceller 14. Accordingly, the nonlinear echo signal included in the input signal acquired by the microphone 13 can be stably suppressed.

Additionally, a residual linear echo signal is suppressed by the echo suppressor 20 from an output signal in which a nonlinear echo signal is suppressed. Accordingly, it is possible to stabilize operation of the echo suppressor 20 and improve linear echo signal suppression performance.

Subsequently, a nonlinear echo model learning method in the present first embodiment will be described.

Figure 6:
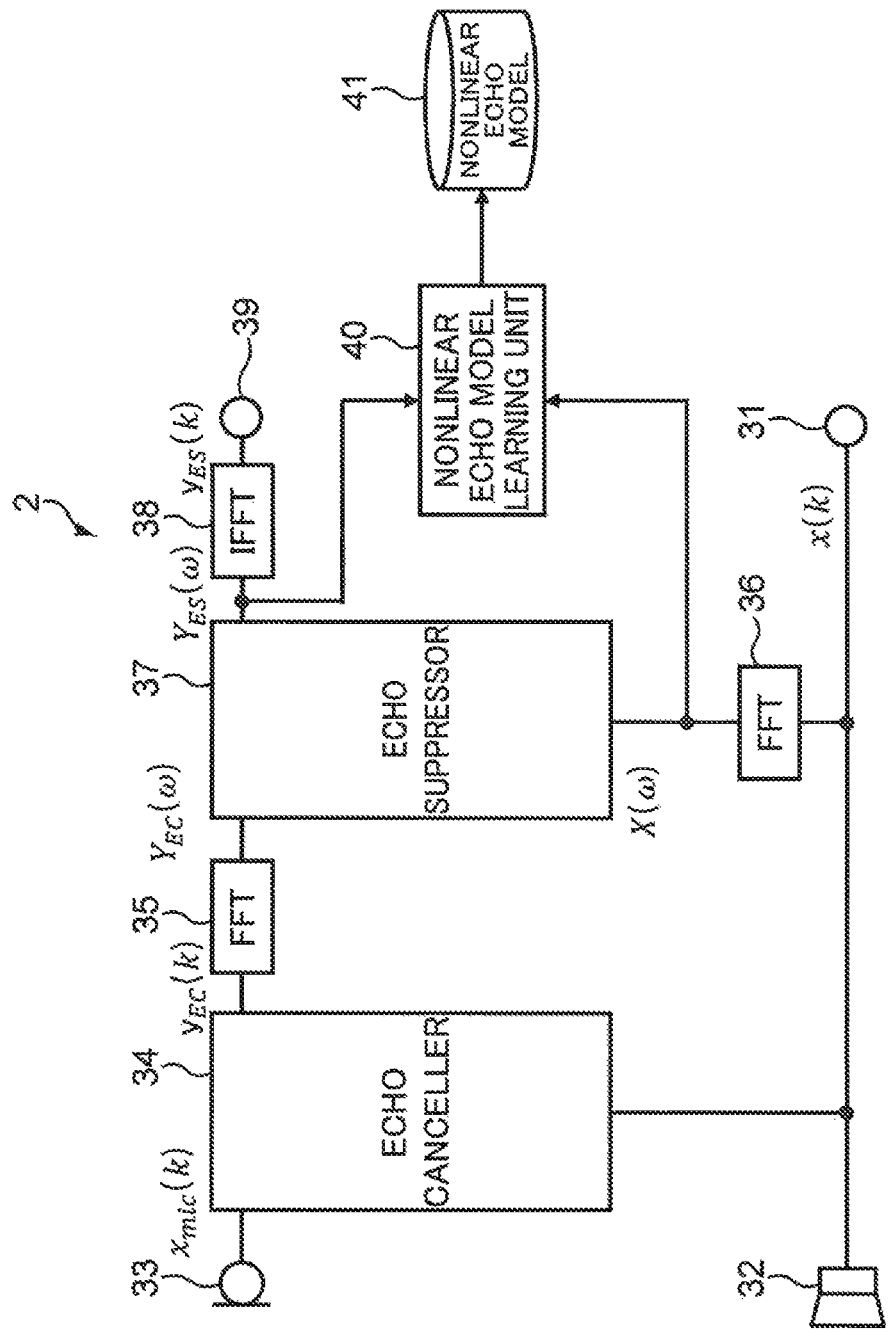
FIG. 6 is a diagram showing a configuration of a learning device in the first embodiment of the present disclosure.
Figure 7:
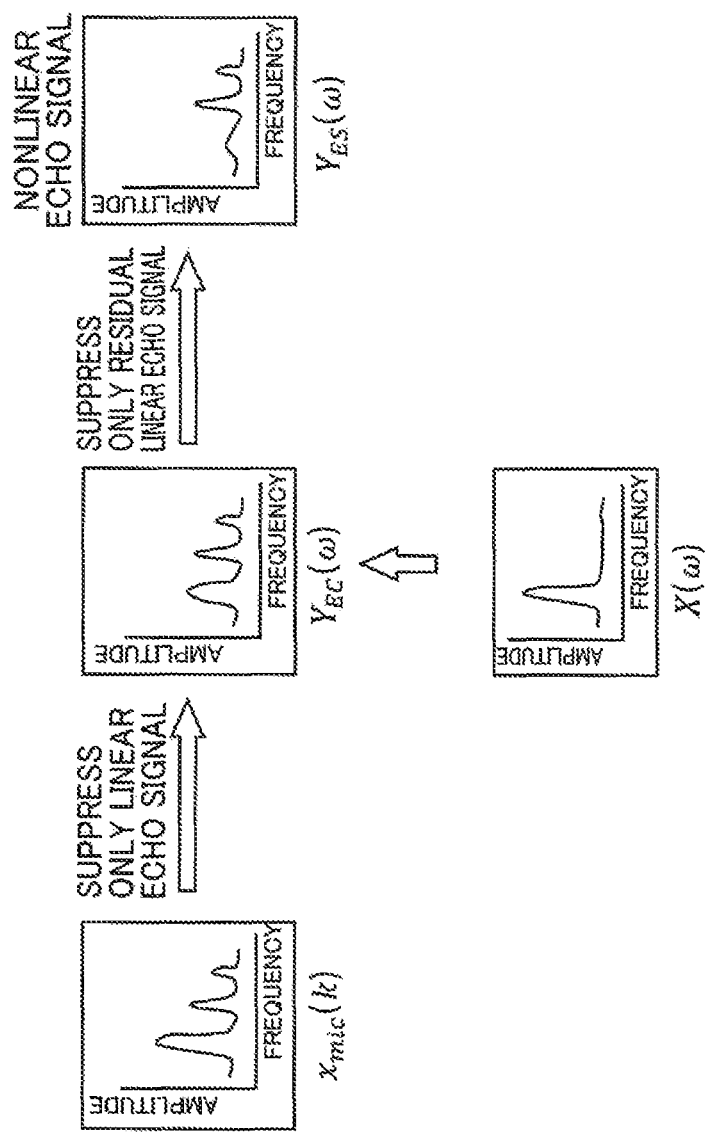
FIG. 7 is a diagram showing one example of a signal to be output from each unit of the learning device in the present first embodiment.

FIG. 6 is a diagram showing a configuration of a learning device in the first embodiment of the present disclosure. FIG. 7 is a diagram showing one example of a signal to be output from each unit of the learning device in the present first embodiment.

The learning device shown in FIG. 6 is provided with a nonlinear echo model creation device 2, an input terminal 31, a speaker 32, a microphone 33, and an output terminal 39.

The input terminal 31 outputs the call reception signal x(k) received from the call device (not shown) on the call reception side to the echo suppression device 1.

The speaker 32 externally outputs the input call reception signal x(k).

The microphone 33 is arranged in a space in which a call transmission party is present, and collects a voice of the call transmission party. The microphone 33 outputs the input signal $x_{mic}(k)$ indicative of the collected voice to the nonlinear echo model creation device 2.

The output terminal 39 outputs the input signal $y_{ES}(k)$ with a linear echo signal suppressed by the nonlinear echo model creation device 2.

A configuration of the input terminal 31, the speaker 32, the microphone 33, and the output terminal 39 is the same as the configuration of the input terminal 11, the speaker 12, the microphone 13, and the output terminal 22 in FIG. 3.

The nonlinear echo model creation device 2 is provided with an echo canceller 34, fast Fourier transform units 35 and 36, an echo suppressor 37, an inverse fast Fourier transform unit 38, a nonlinear echo model learning unit 40, and a nonlinear echo model storage unit 41.

The echo canceller 34 estimates an amplitude component and a phase component of a linear echo signal included in the input signal $x_{mic}(k)$ acquired by the microphone 13 to suppress the linear echo signal from the input signal $x_{mic}(k)$. A configuration of the echo canceller 34 is the same as the configuration of the echo canceller 14 shown in FIG. 3. The echo canceller 34 outputs the input signal $y_{EC}(k)$ with a suppressed linear echo signal to the fast Fourier transform unit 35.

The fast Fourier transform unit 35 conducts discrete Fourier transform at a high speed. The fast Fourier transform unit 35 converts the input signal $y_{EC}(k)$ in the time domain to be input from the echo canceller 34 to the echo suppressor 37 into the input signal $Y_{EC}(\omega)$ in the frequency domain. The fast Fourier transform unit 35 outputs the input signal $Y_{EC}(\omega)$ in the frequency domain with only the linear echo signal suppressed by the echo canceller 34 to the echo suppressor 37.

The fast Fourier transform unit 36 conducts discrete Fourier transform at a high speed. The fast Fourier transform unit 36 converts the call reception signal x(k) in the time domain to be input to the echo suppressor 37 into the call reception signal $X(\omega)$ in the frequency domain. The fast Fourier transform unit 36 outputs the call reception signal $X(\omega)$) in the frequency domain to the echo suppressor 37 and the nonlinear echo model learning unit 40.

The echo suppressor 37 estimates an amplitude component of a residual linear echo signal not suppressed by the echo canceller 34 to suppress a residual linear echo signal from the input signal $Y_{EC}(\omega)$. The echo suppressor 37 outputs the input signal $Y_{ES}(\omega)$ with only a residual linear echo signal suppressed from the input signal $Y_{EC}(\omega)$ to the inverse fast Fourier transform unit 21 and the nonlinear echo model learning unit 40.

The inverse fast Fourier transform unit 38 conducts inverse discrete Fourier transform at a high speed. The inverse fast Fourier transform unit 38 converts the input signal $Y_{ES}(107)$ in the frequency domain to be input from the echo suppressor 37 to the output terminal 39 into the input signal $y_{ES}(k)$ in the time domain. The inverse fast Fourier transform unit 38 outputs the input signal $y_{ES}(k)$ to the output terminal 39.

The nonlinear echo model learning unit 40 learns a nonlinear echo model in which there are used, as teacher data, at least one of the call reception signal $X(\omega)$ and the input signal $x_{mic}(k)$, and the output signal $Y_{ES}(\omega)$ of the echo suppressor 37 which suppresses a residual linear echo signal from the output signal $Y_{EC}(\omega)$ of the echo canceller 34 which suppresses a linear echo signal from the input signal $x_{mic}(k)$, with at least one of the call reception signal $X(\omega)$ and the input signal $x_{mic}(k)$ used as an input and with the nonlinear echo signal used as an output. The nonlinear echo model learning unit 40 in the present first embodiment learns a nonlinear echo model in which there are used, as teacher data, the call reception signal. $X(\omega)$, and the output signal $Y_{ES}(\omega)$ of the echo suppressor 37 which suppresses a residual linear echo signal from the output signal $Y_{EC}(\omega)$ of the echo canceller 34 which suppresses a linear echo signal from the input signal $x_{mic}(k)$, with the call reception signal $X(\omega)$ as an input and the nonlinear echo signal as an output.

The nonlinear echo model is a neural network in which the amplitude spectrum $X(\omega)$ of the call reception signal, and the residual echo amplitude spectrum $Y_{ES}(\omega)$ of the echo canceller 34 and the echo suppressor 37 are learned in advance as teacher data. The echo canceller 34 and the echo suppressor 37 can suppress only a linear echo signal. Therefore, output signals (residual echo signals) of the echo canceller 34 and the echo suppressor 37 are substantially equal to nonlinear echo signals. Thus, the nonlinear echo model learning unit 40 can model a relationship between an amplitude spectrum of a call reception signal and an amplitude spectrum of a nonlinear echo signal.

Examples of machine learning include supervised learning in which a relationship between an input and an output is learned using teacher data in which a label (output information) is applied to input information, unsupervised learning in which a data structure is constructed with only unlabeled inputs, semi-supervised learning coping with both labelled and unlabeled inputs, and reinforcement learning in which action maximizing a return is learned by trial and error. As a specific method of machine learning, there are provided, not only a neural network (including deep learning using a multi-layered neural network) but also genetic programming, a decision tree, a Bayesian network, or a support vector machine (SVM), etc. The machine learning for the nonlinear echo model may use any of the above-described specific examples.

The nonlinear echo model learning unit 40 stores a learned nonlinear echo model in the nonlinear echo model storage unit 41.

The nonlinear echo model storage unit 41 stores a nonlinear echo model learned by the nonlinear echo model learning unit 40.

The echo suppression device 1 shown in FIG. 3 may be provided with the nonlinear echo model learning unit 40. In this case, the echo suppression device 1 may be further provided with a mode switching unit which switches a learning mode and an echo suppression mode. In a case where switching to the learning mode is conducted by the mode switching unit, the echo canceller 14 outputs an output signal to the echo suppressor 20. The nonlinear echo model learning unit 40 may learn a nonlinear echo model using, as teacher data, the input signal $Y_{ES}(\omega)$ with a linear echo signal suppressed by the echo canceller 14 and the echo suppressor 20, and the call reception signal $X(\omega)$.

Additionally, a nonlinear echo model learned by the learning device may be stored in advance in the nonlinear echo model storage unit 17 of the echo suppression device 1. The echo suppression device 1 may receive a nonlinear echo model learned by the learning device and update the nonlinear echo model stored in the nonlinear echo model storage unit 17.

Subsequently, description will be made of a simulation result of a comparison between an echo suppression amount of the echo suppression device 1 in the present first embodiment and an echo suppression amount in a conventional echo suppression device.

First, in a neural network (nonlinear echo model) used for the simulation, an amplitude spectrum of short-time Fourier transform is used as an input/output feature value.

Figure 8:
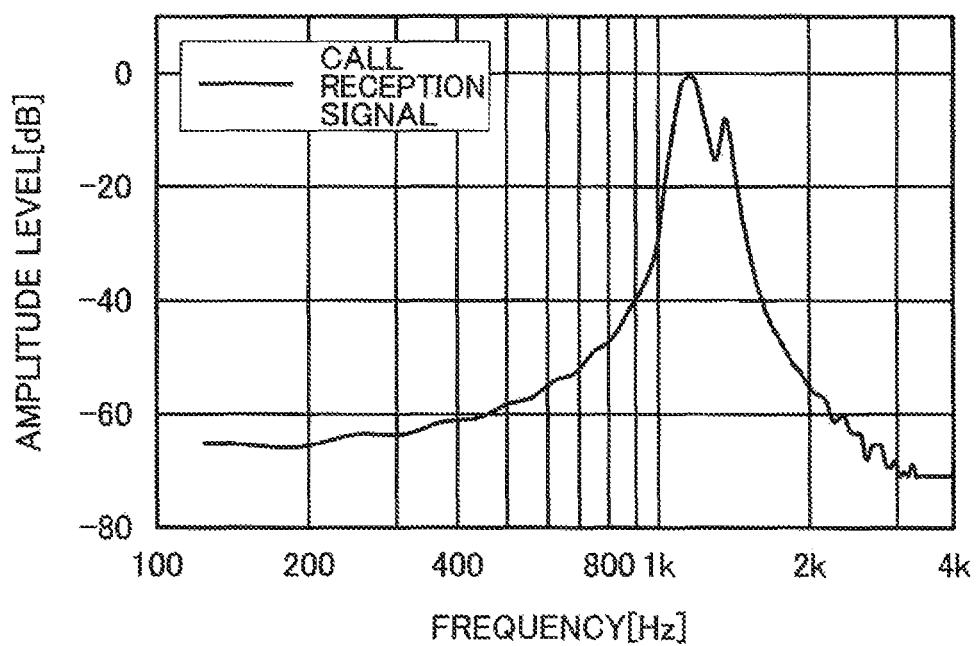
FIG. 8 is a diagram showing an amplitude spectrum of a call reception signal including a ⅓ octave band noise.
Figure 9:
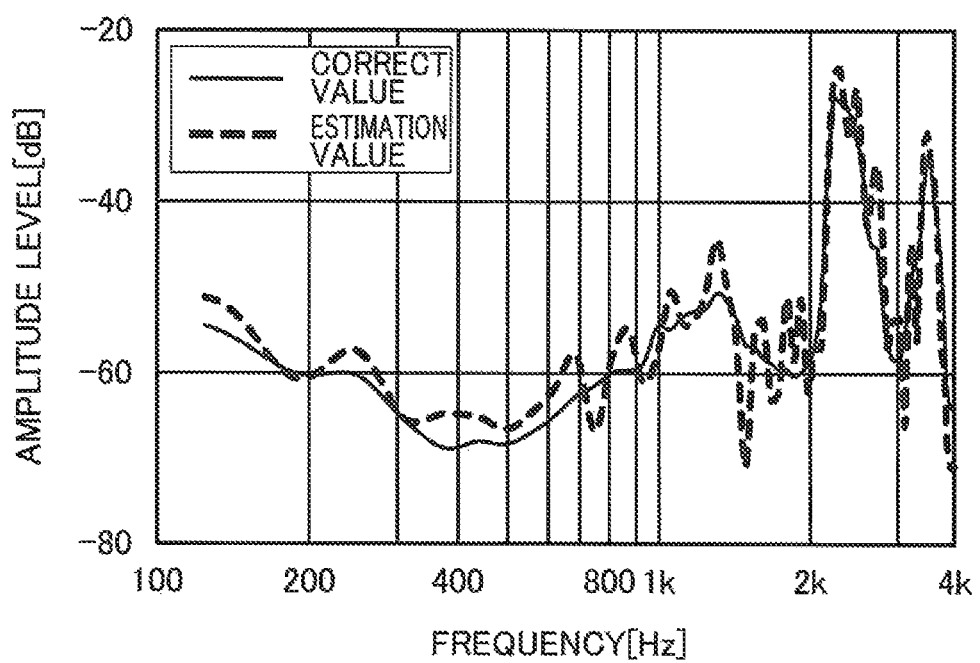
FIG. 9 is a diagram showing amplitude spectra of a correct value and an estimation value of a nonlinear echo signal included in an input signal obtained by a microphone when the call reception signal shown in FIG. 8 is loudspoken.
Figure 10:
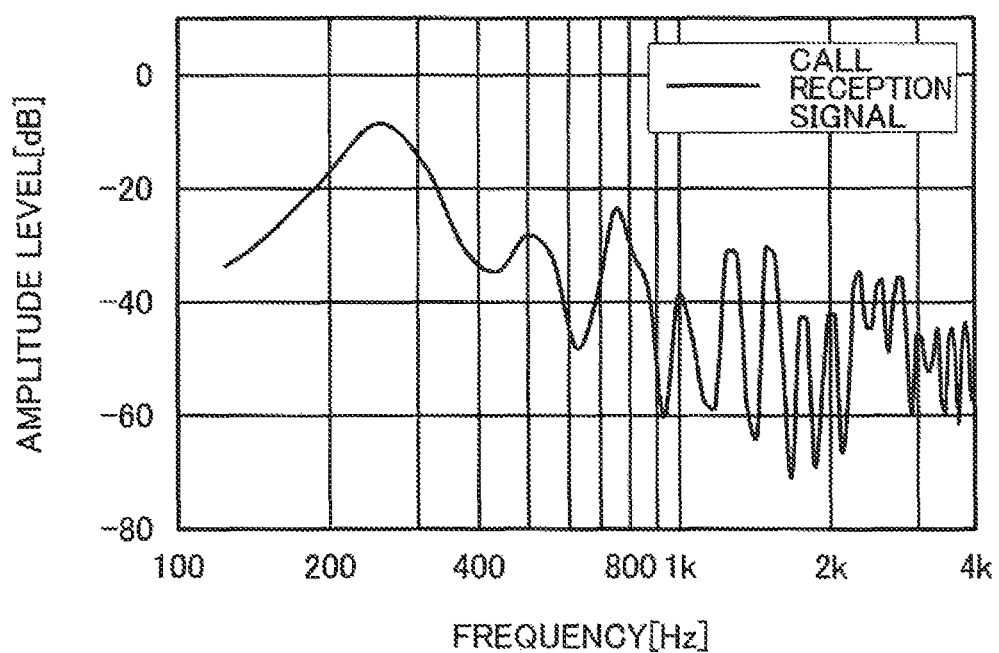
FIG. 10 is a diagram showing an amplitude spectrum of a call reception signal including a female voice.
Figure 11:
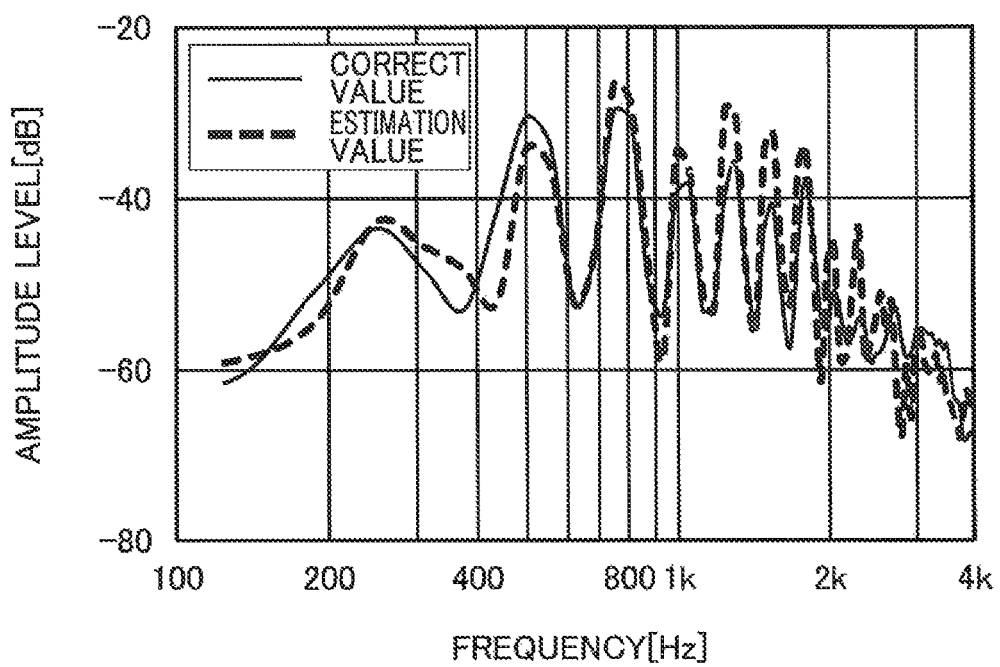
FIG. 11 is a diagram showing amplitude spectra of a correct value and an estimation value of a nonlinear echo signal included in an input signal obtained by the microphone when the call reception signal shown in FIG. 10 is loudspoken.

FIG. 8 to FIG. 11 are diagrams showing examples where an, amplitude spectrum of a nonlinear echo signal is estimated in the neural network. FIG. 8 is a diagram showing an amplitude spectrum of a call reception signal including a ⅓ octave band noise, and FIG. 9 is a diagram showing amplitude spectra of a correct value and an estimation value of a nonlinear echo signal included in an input signal obtained by a microphone when the call reception signal shown in FIG. 8 is loudspoken. FIG. 10 is a diagram showing an amplitude spectrum of a call reception signal including a female voice, and FIG. 11 is a diagram showing amplitude spectra of a correct value and an estimation value of a nonlinear echo signal included in an input signal obtained by the microphone when the call reception signal shown in FIG. 10 is loudspoken.

In each of FIG. 8 to FIG. 11, the horizontal axis represents a frequency and the vertical axis represents an amplitude level. In FIG. 9 and FIG. 11, solid lines represent a correct value of a nonlinear echo signal and broken lines represent an estimation value of the nonlinear echo signal.

As shown in FIG. 9 and FIG. 11, it can be found that the neural network estimates a nonlinear echo signal indicated by the solid line with high precision.

Next, description will be made of simulation results obtained by the echo suppression device 1 in the present first embodiment using the learned neural network and obtained by a conventional echo suppression device. The conventional echo suppression device is provided only with an echo canceller and an echo suppressor and suppresses only a linear echo signal by the echo canceller and the echo suppressor.

Figure 12:
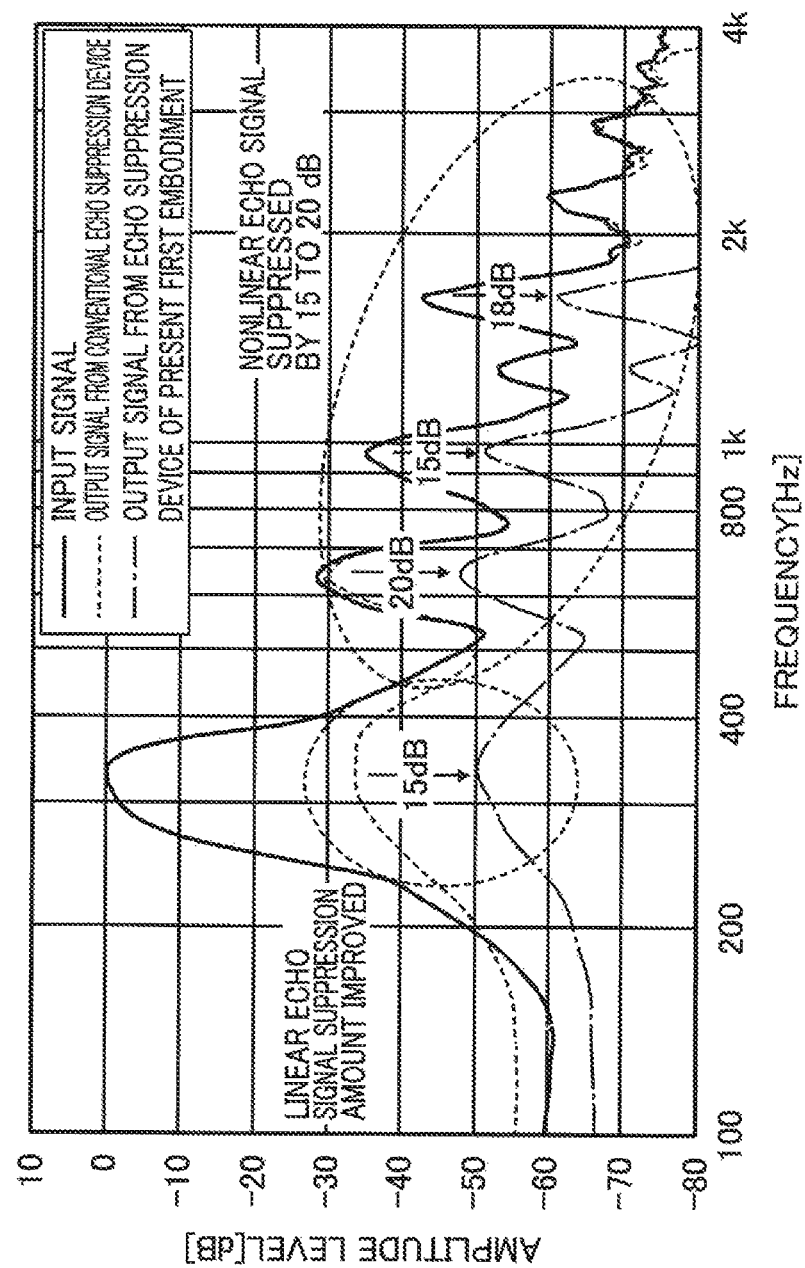
FIG. 12 is a diagram showing results of frequency analyses of an output signal from a conventional echo suppression device and an output signal from the echo suppression device in the present first embodiment.

FIG. 12 is a diagram showing results of frequency analyses of an output signal from a conventional echo suppression device and an output signal from the echo suppression device in the present first embodiment. In FIG. 12, the horizontal axis represents a frequency and the vertical axis represents an amplitude level. In FIG. 12, a solid line represents an input signal from the microphone 13, a broken line represents an output signal from the conventional echo suppression device, and a chain dotted line represents an output signal from the echo suppression device 1 of the present first embodiment. Additionally, the call reception signal is a ⅓ octave band noise with a center frequency of 315 Hz.

As shown in FIG. 12, the echo suppression device 1 of the present first embodiment obtains a suppression effect of 15 dB to 20 dB exceeding a target value with respect to a harmonic distortion as a nonlinear echo signal. Further, the echo suppression device 1 of the present first embodiment obtains an effect of suppression higher by about 15 dB than by the conventional echo suppression device also with respect to a 315 Hz linear echo signal. This is considered to be derived from stable estimation of an acoustic coupling amount in the echo suppressor 20 at the later stage, the stable estimation being enabled by suppression of a nonlinear echo signal by the nonlinear echo suppression unit 19 of the present first embodiment.

Next, description will be made of evaluation results of echo suppression amounts obtained by the echo suppression device 1 of the present first embodiment and the conventional echo suppression device with respect to an input signal having a complicated frequency structure such as a person's voice. As an evaluation index, ERLE (Echo Return Loss Enhancement) indicating an echo suppression amount was used. ERLE is calculated by an equation (6) below.

$$ERLE = 20\log_{10}\left\{ \sqrt{\frac{1}{N}\sum_{k=1}^{N}|y_{EC}(k)|^2} \Big/ \sqrt{\frac{1}{N}\sum_{k=1}^{N}|y_{ES}(k)|^2} \right\} \quad (6)$$

FIG. 13 is a diagram showing a temporal change of an amplitude of an input signal including a male voice and a temporal change of an echo suppression amount (ERLE with respect to the input signal. In an upper part of FIG. 13, the horizontal axis represents time and the vertical axis represents an amplitude. In a lower part of FIG. 13, the horizontal axis represents time and the vertical axis represents an echo suppression amount. Also in the lower part of FIG. 13, a solid line represents an echo suppression amount by the echo suppression device 1 of the present first embodiment and a broken line represents an echo suppression amount by the conventional echo suppression device.

Inc echo suppression device 1 of the present first embodiment obtains an effect of suppression by about 10 dB higher than the suppression obtained by the conventional echo suppression device. It is therefore demonstrated that the echo suppression device 1 of the present first embodiment is sufficiently effective also for an input signal having a complicated frequency structure such as a person's voice.

Thus, the echo suppression device 1 of the present first embodiment enables a comfortable call even a speaker with a lot of distortions, thereby contributing to improvement in quality, and size and cost reduction of a notebook computer, a Web conference system, and the like.

Second Embodiment

The nonlinear echo estimation unit 18 in the first embodiment estimates a nonlinear echo signal included in an input signal from a call reception signal by using a nonlinear echo model indicative of a relationship between the call reception signal and the nonlinear echo signal. By contrast, a nonlinear echo estimation unit in a second embodiment estimates a nonlinear echo signal included in an input signal from a call reception signal and the input signal by using a nonlinear echo model indicative of a relationship between the call reception signal and the input signal, and the nonlinear echo signal.

Figure 14:
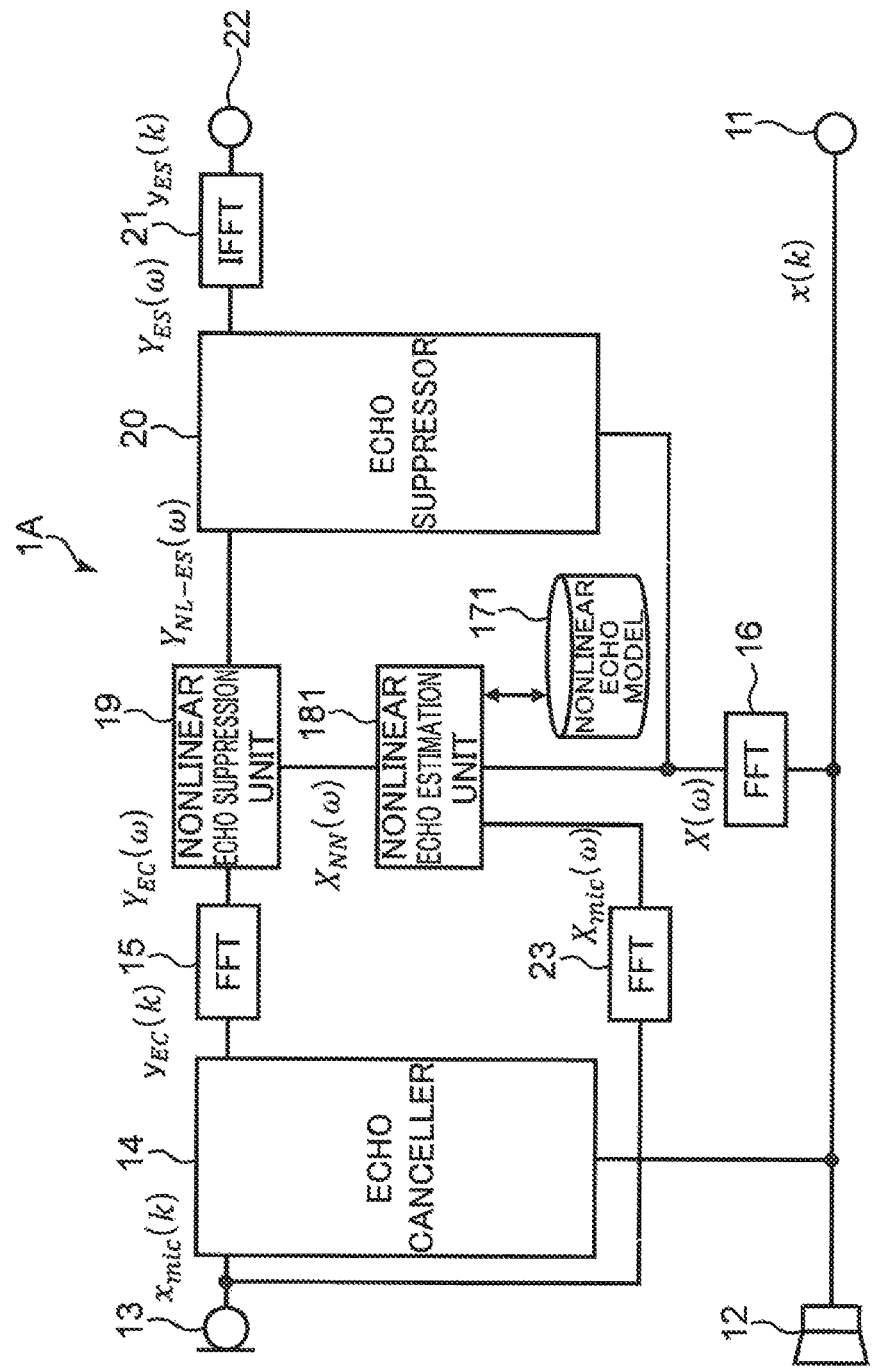
FIG. 14 is a diagram showing a configuration of a call device in a second embodiment of the present disclosure.

FIG. 14 is a diagram showing a configuration of a call device in the second embodiment of the present disclosure.

The call device shown in FIG. 14 is provided with an echo suppression device 1A, the input terminal 11, the speaker 12, the microphone 13, and the output terminal 22. In the present second embodiment, the same configuration as that of the first embodiment will be given the same reference sign to omit description thereof.

The echo suppression device 1A is provided with the echo canceller 14, the fast Fourier transform units 15, 16, and 23, a nonlinear echo model storage unit 171, a nonlinear echo estimation unit 181, the nonlinear echo suppression unit 19, the echo suppressor 20, and the inverse fast Fourier transform unit 21.

The microphone 13 outputs the input signal $x_{mic}(k)$ to the echo canceller 14 and also to the nonlinear echo estimation unit 181 via the fast Fourier transform unit 23.

The fast Fourier transform unit 23 conducts discrete Fourier transform at a high speed. The fast Fourier transform unit 23 converts the input signal $x_{mic}(k)$ in the time domain to be input to the nonlinear echo estimation unit 181 into the input signal $X_{mic}(\omega)$ in the frequency domain. The fast Fourier transform unit 23 outputs the input signal $X_{mic}(\omega)$ in the frequency domain to the nonlinear echo estimation unit 181.

The nonlinear echo model storage unit 171 stores in advance a nonlinear echo model indicative of a relationship between a call reception signal to be output to the speaker 12 and an input signal acquired by the microphone 13, and a nonlinear echo signal. The nonlinear echo model is, for example, a neural network.

The nonlinear echo model in the present second embodiment uses, as teacher data, a call reception signal, an input signal, and an output signal of the echo suppressor which suppresses a residual linear echo signal from an output signal of the echo canceller which suppresses a linear echo signal from the input signal, and is learned with the call reception signal and the input signal as an input and the nonlinear echo signal as an output.

In a learning method of the nonlinear echo model in the second embodiment, the call reception signal $X(\omega)$ and the input signal $X_{mic}(\omega)$ in the frequency domain are input to the nonlinear echo model learning unit 40 shown in FIG. 6. Then, the nonlinear echo model learning unit 40 in the present second embodiment learns a nonlinear echo model in which there are used, as teacher data, the call reception signal $X(\omega)$, the input signal $X_{mic}(\omega)$, and the output signal $Y_{EC}(\omega)$ of the echo suppressor 37 which suppresses a residual linear echo signal from the output signal $Y_{EC}(\omega)$ of the echo canceller 34 which suppresses a linear echo signal from the input signal $x_{mic}(k)$, with the call reception signal $X(\omega)$ and the input signal $X_{mic}(\omega)$ as an input and the nonlinear echo signal as an output.

The nonlinear echo estimation unit 181 estimates the nonlinear echo signal $X_{NN}(\omega)$ included in the input signal from the call reception signal $X(\omega)$ and the input signal $X_{mic}(\omega)$ by using a nonlinear echo model indicative of a relationship between a call reception signal and an input signal, and a nonlinear echo signal.

The nonlinear echo estimation unit 181 reads the nonlinear echo model from the nonlinear echo model storage unit 171. The nonlinear echo estimation unit 181 acquires the nonlinear echo signal $X_{NN}(\omega)$ from the nonlinear echo model by inputting, to the nonlinear echo model, the call reception signal $X(\omega)$ output from the fast Fourier transform unit 16 and the input signal $X_{mic}(\omega)$ output from the fast Fourier transform unit 23. The nonlinear echo estimation unit 181 outputs the nonlinear echo signal $X_{NN}(\omega)$ estimated by using the call reception signal $X(\omega)$ and the input signal. $X_{mic}(\omega)$ to the nonlinear echo suppression unit 19.

Operation of the echo suppression device 1A the present second embodiment differs from the first embodiment only in Step S2 shown in FIG. 5. Specifically, the nonlinear echo estimation unit 181 in the present second embodiment estimates the nonlinear echo signal $X_{NN}(\omega)$ from the call reception signal $X(\omega)$ and the input signal $X_{mic}(\omega)$ by using the nonlinear echo model indicative of a relationship between a call reception signal and an input signal, and a nonlinear echo signal.

In the present second embodiment, since a nonlinear echo signal is estimated from a call reception signal and an input signal, an estimation precision of a nonlinear echo signal can be further improved.

Third Embodiment

The nonlinear echo estimation unit 18 in the first embodiment estimates a nonlinear echo signal included in an input signal from a call reception signal by using a nonlinear echo model indicative of a relationship between the call reception signal and the nonlinear echo signal. By contrast, a nonlinear echo estimation unit in a third embodiment estimates a nonlinear echo signal included in an input signal from a call reception signal and an output signal of the echo canceller 14 by using a nonlinear echo model indicative of a relationship between the call reception signal and the output signal of the echo canceller 14, and the nonlinear echo signal.

Figure 15:
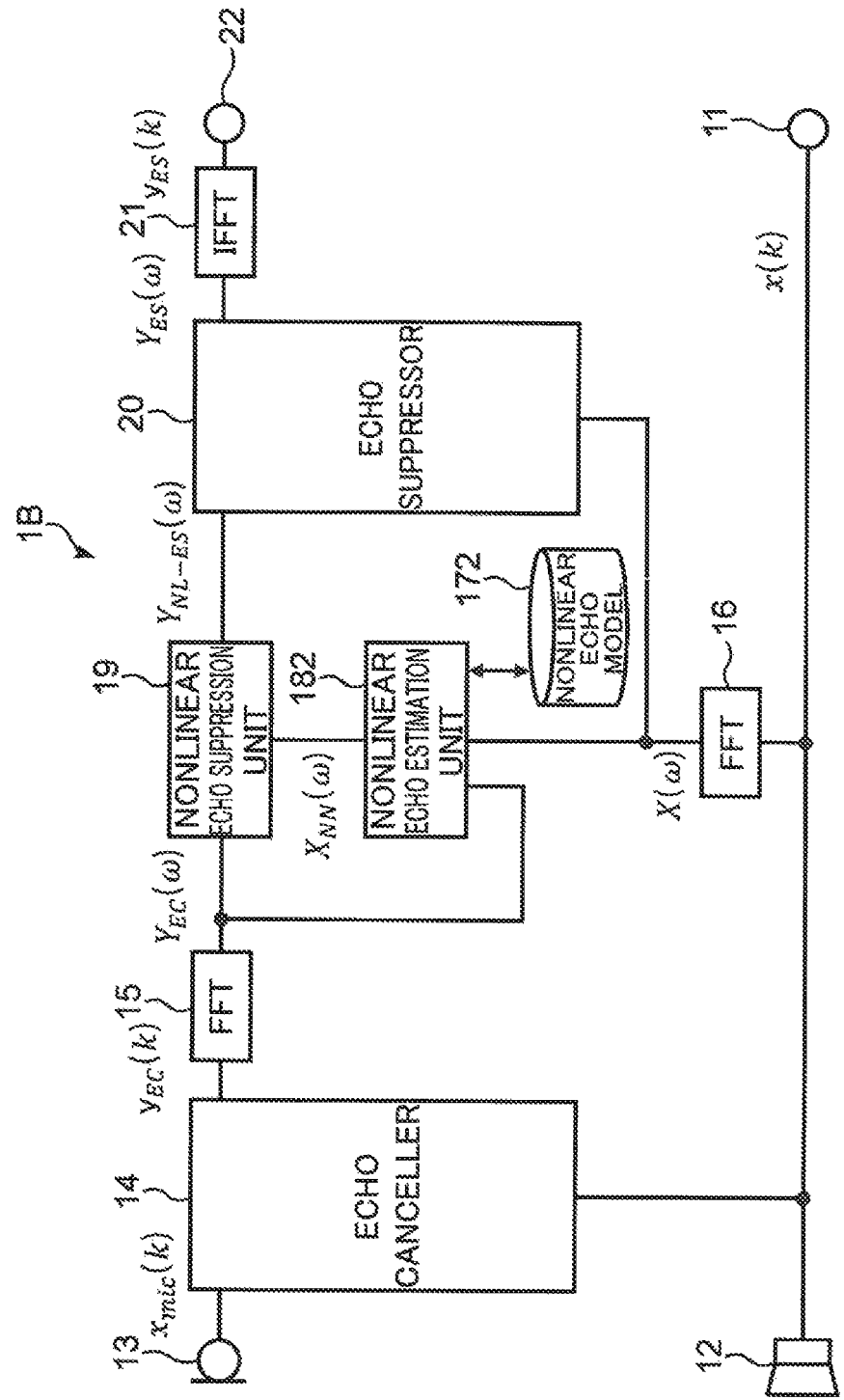
FIG. 15 is a diagram showing a configuration of a call device in a third embodiment of the present disclosure.

FIG. 15 is a diagram showing a configuration of a call device in the third embodiment of the present disclosure.

The call device shown in FIG. 15 is provided with an echo suppression device 1B, the input terminal 11, the speaker 12, the microphone 13, and the output terminal 22. In the present third embodiment, the same configuration as that of the first embodiment will be given the same reference sign to omit description thereof.

The echo suppression device 1B is provided with the echo canceller 14, the fast Fourier transform units 15 and 16, a nonlinear echo model storage unit 172, a nonlinear echo estimation unit 182, the nonlinear echo suppression unit 19, the echo suppressor 20, and the inverse fast Fourier transform unit 21.

The fast Fourier transform unit 15 outputs the input signal $Y_{EC}(\omega)$ in the frequency domain with only a linear echo signal suppressed by the echo canceller 14 to the nonlinear echo suppression unit 19 and the nonlinear echo estimation unit 182.

The nonlinear echo model storage unit 172 stores, in advance, a nonlinear echo model indicative of a relationship between a call reception signal to be output to the speaker 12 and an output signal of the echo canceller, and a nonlinear echo signal. The nonlinear echo model is, for example, a neural network.

The nonlinear echo model in the present third embodiment uses, as teacher data, a call reception signal, an output signal of the echo canceller, and an output signal of the echo suppressor which suppresses a residual linear echo signal from an output signal of the echo canceller which suppresses a linear echo signal from an input signal, and is learned with the call reception signal and the output signal of the echo canceller as an input and the nonlinear echo signal as an output.

In a learning method of the nonlinear echo model in the third embodiment, the call reception signal $X(\omega)$ and the output signal $Y_{EC}(\omega)$ in the frequency domain of the echo canceller 34 are input to the nonlinear echo model learning unit 40 shown in FIG. 6. Then, the nonlinear echo model learning unit 40 in the present third embodiment learns a nonlinear echo model in which there are used, as teacher data, the call reception signal $X(\omega)$, the output signal $Y_{EC}(\omega)$ in the frequency domain of the echo canceller 34, and the output signal $Y_{ES}(\omega)$ of the echo suppressor 37 which suppresses a residual linear echo signal from the output signal $Y_{EC}(\omega)$ in the frequency domain of the echo canceller 34 which suppresses a linear echo signal from the input signal $x_{mic}(k)$, with the call reception signal $X(\omega)$ and the output signal $Y_{EC}(\omega)$ in the frequency domain of the echo canceller 34 as an input and the nonlinear echo signal as an output.

The nonlinear echo estimation unit 182 estimates the nonlinear echo signal $X_{NN}(\omega)$ included in an input signal from the call reception signal $X(\omega)$ and the output signal $Y_{EC}(\omega)$ in the frequency domain of the echo canceller 14 by using a nonlinear echo model indicative of a relationship between a call reception signal and an output signal of the echo canceller, and a nonlinear echo signal.

The nonlinear echo estimation unit 182 reads the nonlinear echo model from the nonlinear echo model storage unit 172. The nonlinear echo estimation unit 182 acquires the nonlinear echo signal $X_{NN}(\omega)$ from the nonlinear echo model by inputting, to the nonlinear echo model, the call reception signal $X(\omega)$ output from the fast Fourier transform unit 16 and the input signal $Y_{EC}(\omega)$ output from the fast Fourier transform unit 15. The nonlinear echo estimation unit 182 outputs the nonlinear echo signal $X_{NN}(\omega)$ estimated by using the call reception signal $X(\omega)$ and the input signal $Y_{EC}(\omega)$ to the nonlinear echo suppression unit 19.

Operation of the echo suppression device 1B in the present third embodiment differs from the first embodiment only in Step S2 shown in FIG. 5. Specifically, the nonlinear echo estimation unit 182 in the present third embodiment estimates the nonlinear echo signal $X_{NN}(\omega)$ from the call reception signal $X(\omega)$ and the output signal $Y_{EC}(\omega)$ in the frequency domain of the echo canceller 14 by using the nonlinear echo model indicative of a relationship between a call reception signal and an output signal of the echo canceller 14, and a nonlinear echo signal.

In the present third embodiment, since a nonlinear echo signal is estimated from a call reception signal and an output signal of the echo canceller, an estimation precision of a nonlinear echo signal can be further improved.

Fourth Embodiment

The nonlinear echo estimation unit 18 in the first embodiment estimates a nonlinear echo signal included in an input signal from a call reception signal by using a nonlinear echo model indicative of a relationship between the call reception signal and the nonlinear echo signal. By contrast, a nonlinear echo estimation unit in a fourth embodiment estimates a nonlinear echo signal included in an input signal from a call reception signal and a pseudo linear echo signal from an adaptive filter of an echo canceller by using a nonlinear echo model indicative of a relationship between the call reception signal and the pseudo linear echo signal from the adaptive filter of the echo canceller, and the nonlinear echo signal.

Figure 16:
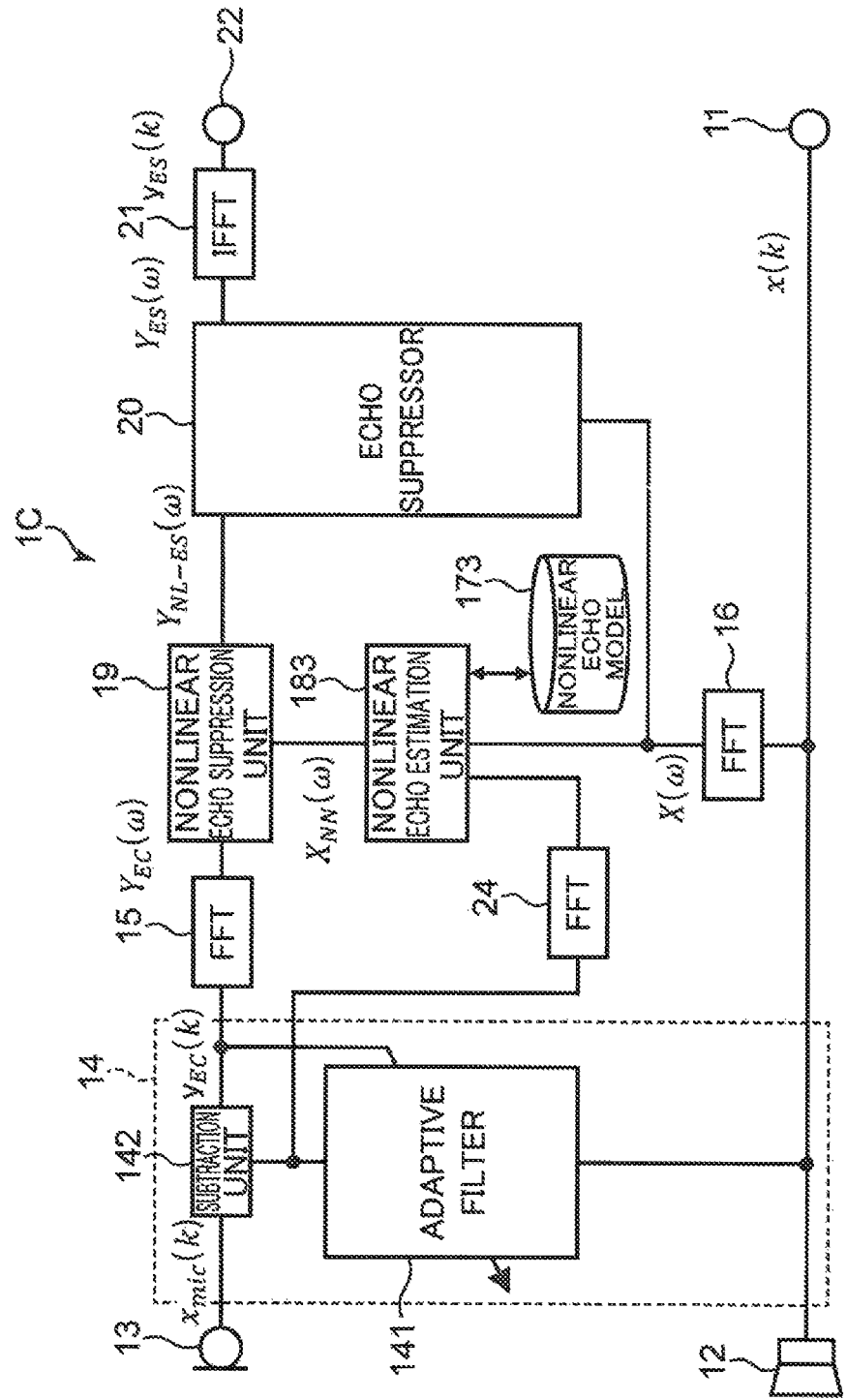
FIG. 16 is a diagram s lowing a configuration of a call device in a fourth embodiment of the present disclosure.

FIG. 16 is a diagram showing a configuration of a call device in the fourth embodiment of the present disclosure.

The call device shown in. FIG. 16 is provided with an echo suppression device 1C, the input terminal 11, the speaker 12, the microphone 13, and the output terminal 22. In the fourth embodiment, the same configuration as that of the first embodiment will be given the same reference sign to omit description thereof.

The echo suppression device 1C is provided with the echo canceller 14, the fast Fowler transform units 15, 16, 24, a nonlinear echo model storage unit 173, a nonlinear echo estimation unit 183, the nonlinear echo suppression unit 19, the echo suppressor 20, and the inverse fast Fourier transform unit 21.

The echo canceller 14 is provided with an adaptive filter 141 and a subtraction unit 142. The adaptive filter 141 generates a pseudo linear echo signal indicative of a component of a call reception signal included in an input signal by convoluting a filtering coefficient and the call reception signal. The subtraction unit 142 subtracts a pseudo linear echo signal from an input The fast Fourier transform unit 24 conducts discrete Fourier transform at a high speed. The fast Fourier transform unit 24 converts a pseudo linear echo signal in the time domain to be input to the nonlinear echo estimation unit 183 into a pseudo linear echo signal in the frequency domain. The fast Fourier transform unit 24 outputs the pseudo linear echo signal in the frequency domain to the nonlinear echo estimation unit 183.

The nonlinear echo model storage unit 173 stores, in advance, a nonlinear echo model indicative of a relationship between a call reception signal to be output to the speaker 12 and a pseudo linear echo signal from the adaptive filter of the echo canceller, and a nonlinear echo signal. The nonlinear echo model is, for example, a neural network.

The nonlinear echo model in the present fourth embodiment uses, as teacher data, a call reception signal, a pseudo linear echo signal from the adaptive filter of the echo canceller, and an output signal of the echo suppressor which suppresses a residual linear echo signal from an output signal of the echo canceller which suppresses a linear echo signal from an input signal, and is learned with the call reception signal and the pseudo linear echo signal as an input and the nonlinear echo signal as an output.

In a learning method of the nonlinear echo model in the fourth embodiment, the call reception signal $X(\omega)$ and the pseudo linear echo signal from the adaptive filter of the echo canceller 34 are input to the nonlinear echo model learning unit 40 shown in FIG. 6. Then, the nonlinear echo model learning unit 40 in the present fourth embodiment learns a nonlinear echo model in which there are used, as teacher data, the call reception signal $X(\omega)$, the pseudo linear echo signal from the adaptive filter of the echo canceller 34, and the output signal $Y_{ES}(\omega)$ of the echo suppressor 37 which suppresses a residual linear echo signal from the output signal $Y_{EC}(\omega)$ of the echo canceller 34 which suppresses a linear echo signal from the input signal $x_{mic}(k)$, with the call reception signal $X(\omega)$ and the pseudo linear echo signal as an input and the nonlinear echo signal as an output.

The nonlinear echo estimation unit 183 estimates the nonlinear echo signal $X_{NN}(\omega)$ included in an input signal from the call reception signal $X(\omega)$ and the pseudo linear echo signal from the adaptive filter 141 by using a nonlinear echo model indicative of a relationship between a call reception signal and a pseudo linear echo signal from the adaptive filter, and a nonlinear echo signal.

The nonlinear echo estimation unit 183 reads the nonlinear echo model from the nonlinear echo model storage unit 173. The nonlinear echo estimation unit 183 acquires the nonlinear echo signal $X_{NN}(\omega)$ from the nonlinear echo model by inputting, to the nonlinear echo model, the call reception signal $X(\omega)$ output from the fast Fourier transform unit 16 and the pseudo linear echo signal output from the fast Fourier transform unit 24. The nonlinear echo estimation unit 183 outputs the nonlinear echo signal $X_{NN}(\omega)$ estimated by using the call reception signal $X(\omega)$ and the pseudo linear echo signal to the nonlinear echo suppression unit 19.

Operation of the echo suppression device 1C in the present fourth embodiment differs from the first embodiment only in Step S2 shown in FIG. 5. Specifically, the nonlinear echo estimation unit 183 in the present fourth embodiment estimates the nonlinear echo signal $X_{NN}(\omega)$ from the call reception signal $X(\omega)$ and the pseudo linear echo signal from the adaptive filter 141 of the echo canceller 14 by using the nonlinear echo model indicative of a relationship between a call reception signal and a pseudo linear echo signal from the adaptive filter of the echo canceller, and a nonlinear echo signal.

In the present fourth embodiment, since a nonlinear echo signal is estimated from a call reception signal and a pseudo linear echo signal from the adaptive filter 141 of the echo canceller 14, an estimation precision of a nonlinear echo signal can be further improved.

Fifth Embodiment

The nonlinear echo estimation unit 18 in the first embodiment estimates a nonlinear echo signal included in an input signal from a call reception signal by using a nonlinear echo model indicative of a relationship between the call reception signal and the nonlinear echo signal. By contrast, a nonlinear echo estimation unit in a fifth embodiment estimates a nonlinear echo signal included in an input signal from the input signal by using a nonlinear echo model indicative of a relationship between the input signal and the nonlinear echo signal.

Figure 17:
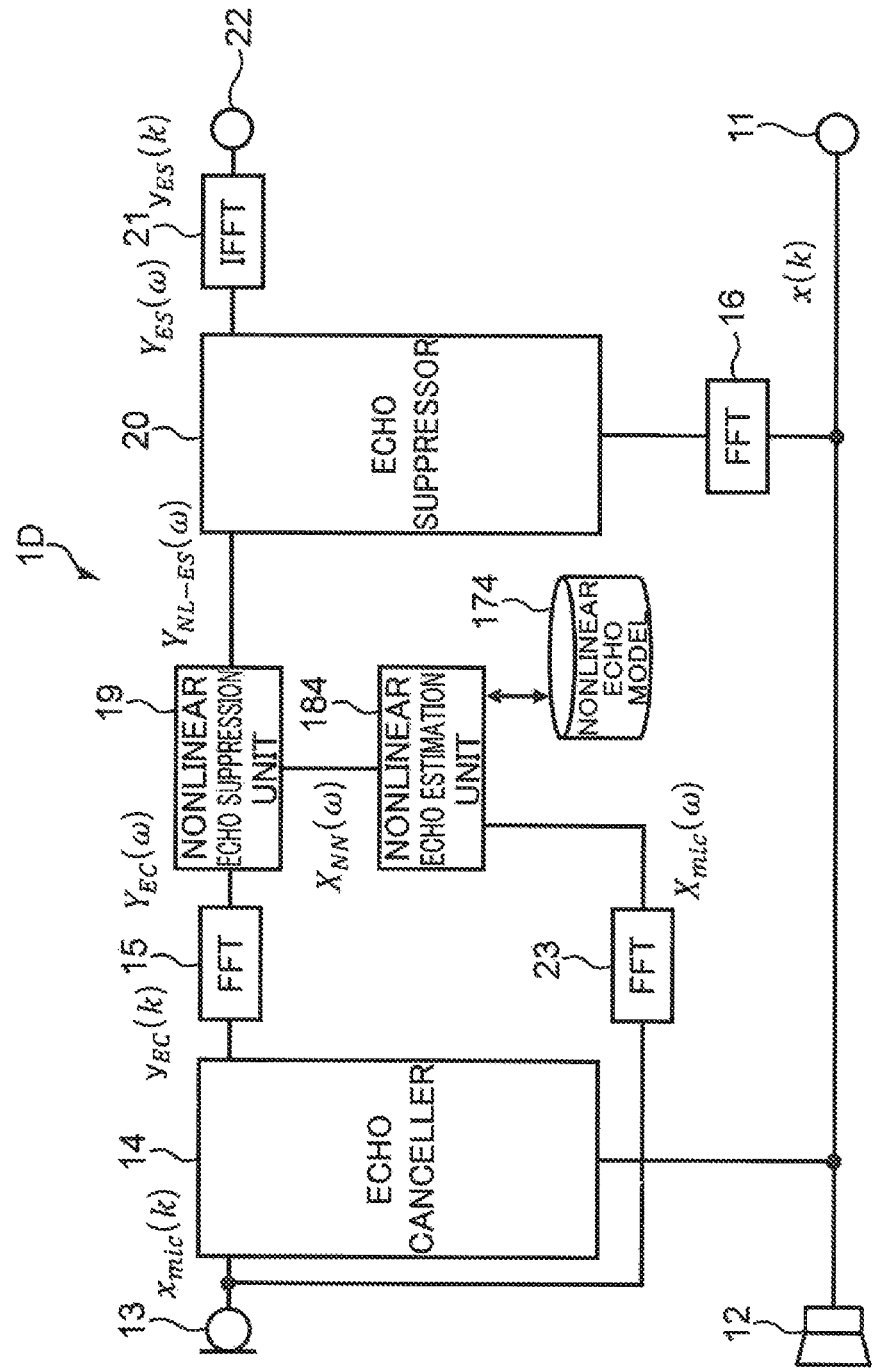
FIG. 17 is a diagram showing a configuration of a call device in a fifth embodiment of the present disclosure.

FIG. 17 is a diagram showing a configuration of a call device in the fifth embodiment of the present disclosure.

The call device shown in FIG. 17 is provided with an echo suppression device 1D, the input terminal 11, the speaker 12, the microphone 13, and the output terminal 22. In the fifth embodiment, the same configuration as those of the first and second embodiments will be given the same reference sign to omit description thereof.

The echo suppression device 1D is provided with the echo canceller 14, the fast Fourier transform units 15, 16, 23, a nonlinear echo model storage unit 174, a nonlinear echo estimation unit 184, the nonlinear echo suppression unit 19, the echo suppressor 20, and the inverse fast Fourier transform unit 21.

The microphone 13 outputs the input signal $x_{mic}(k)$ to the echo canceller 14 and also to the nonlinear echo estimation unit 184 via the fast Fourier transform unit 23.

The fast Fourier transform unit 23 conducts discrete Fourier transform at a high speed. The fast Fourier transform unit 23 converts the input signal $x_{mic}(k)$ in the time domain to be input to the nonlinear echo estimation unit 184 into the input signal $X_{mic}(\omega)$ in the frequency domain. The fast Fourier transform unit 23 outputs the input signal $X_{mic}(\omega)$ in the frequency domain to the nonlinear echo estimation unit 184.

The nonlinear echo model storage unit 174 stores, in advance, a nonlinear echo model indicative of a relationship between an input signal acquired by the microphone 13 and a nonlinear echo signal. The nonlinear echo model is, for example, a neural network.

The nonlinear echo model in the present fifth embodiment uses, as teacher data, an input signal acquired by the microphone, and an output signal of the echo suppressor which suppresses a residual linear echo signal from an output signal of the echo canceller which suppresses a linear echo signal from the input signal, and is learned with the input signal as an input and the nonlinear echo signal as an output.

In a learning method of the nonlinear echo model in the fifth embodiment, the input signal $X_{mic}(\omega)$ in the frequency domain is input to the nonlinear echo model learning unit 40 shown in FIG. 6. Then, the nonlinear echo model learning unit 40 in the present fifth embodiment learns a nonlinear echo model in which there are used, as teacher data, the input signal $X_{mic}(\omega)$, and the output signal $Y_{ES}(\omega)$ of the echo suppressor 37 which suppresses a residual linear echo signal from the output signal $Y_{EC}(\omega)$ of the echo canceller 34 which suppresses a linear echo signal from the input signal $x_{mic}(k)$, with the input signal $X_{mic}(\omega)$ as an input and the nonlinear echo signal as an output.

The nonlinear echo estimation unit 184 estimates the nonlinear echo signal $X_{NN}(\omega)$ included in the input signal from the input signal $X_{mic}(\omega)$ by using a nonlinear echo model indicative of a relationship between an input signal and a nonlinear echo signal.

The nonlinear echo estimation unit 184 reads the nonlinear echo model from the nonlinear echo model storage unit 174. The nonlinear echo estimation unit 184 acquires the nonlinear echo signal $X_{NN}(\omega)$ from the nonlinear echo model by inputting, to the nonlinear echo model, the input signal $X_{mic}(\omega)$ output from the fast Fourier transform unit 23. The nonlinear echo estimation unit 184 outputs the nonlinear echo signal $X_{NN}(\omega)$ estimated by using the input signal $X_{mic}(\omega)$ to the nonlinear echo suppression unit 19.

Operation of the echo suppression device 1D in the present fifth embodiment differs from the first embodiment only in Step S2 shown in FIG. 5. Specifically, the nonlinear echo estimation unit 184 in the present fifth embodiment estimates the nonlinear echo signal $X_{NN}(\omega)$ from the input signal $X_{mic}(\omega)$ by using the nonlinear echo model indicative of a relationship between an input signal and a nonlinear echo signal.

The fifth embodiment enables estimation of a nonlinear echo signal even from an input signal acquired by the microphone 13.

Sixth Embodiment

In the first embodiment, a nonlinear echo signal estimated by the nonlinear echo estimation unit 18 is output to the nonlinear echo suppression unit 19. By contrast, in the sixth embodiment, an estimation error of a nonlinear echo signal estimated by the nonlinear echo estimation unit 18 is corrected using an output signal of the nonlinear echo suppression unit 19.

Figure 18:
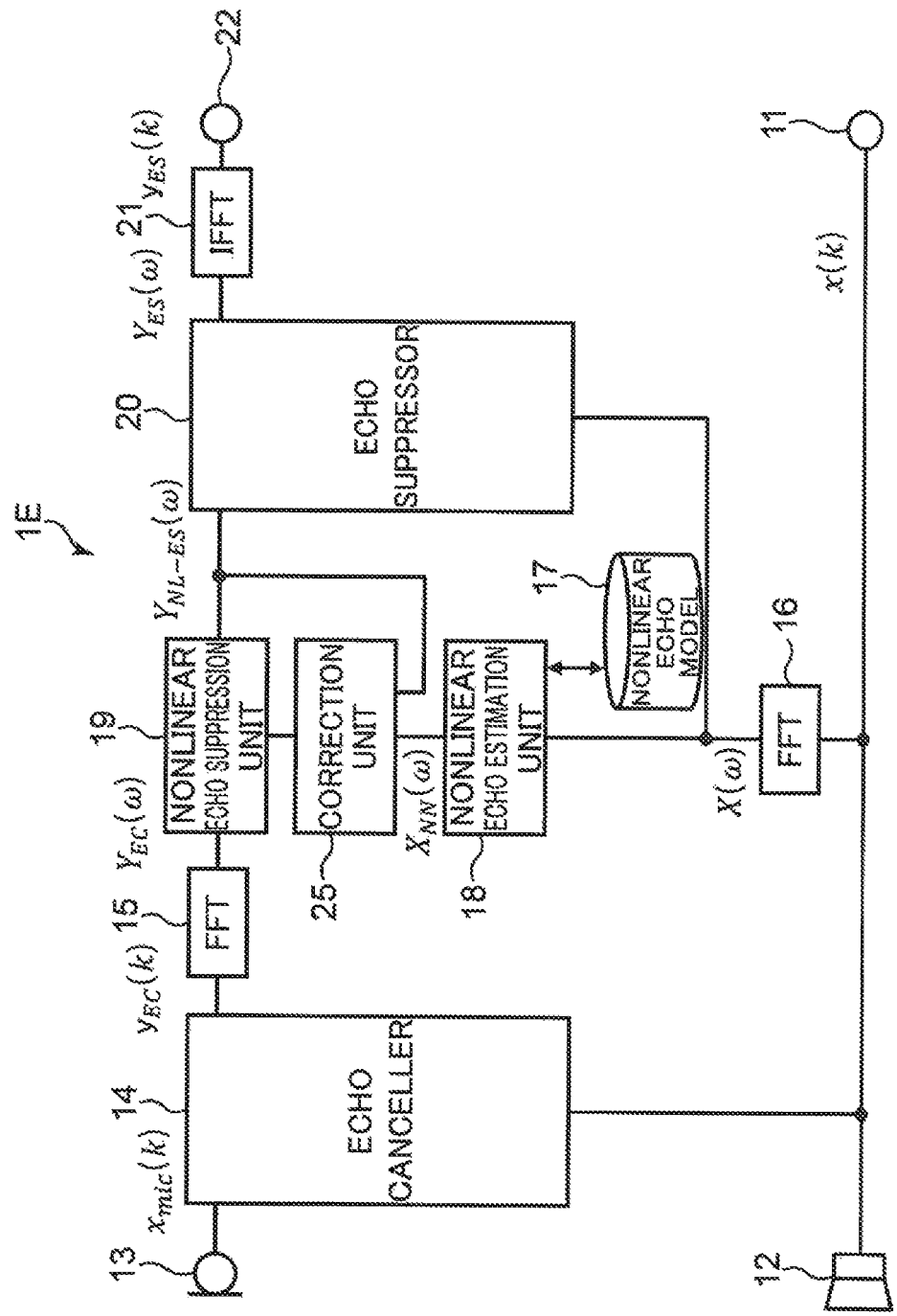
FIG. 18 is a diagram showing a configuration of a call device in a sixth embodiment of the present disclosure.

FIG. 18 is a diagram showing a configuration of a call device in the sixth embodiment of the present disclosure.

The call device shown in FIG. 18 is provided with an echo suppression device 1E, the input terminal 11, the speaker 12, the microphone 13, and the output terminal 22. In the sixth embodiment, the same configuration as that of the first embodiment will be given the same reference sign to omit description thereof.

The echo suppression device 1E is provided with the echo canceller 14, the fast Fourier transform units 15 and 16, the nonlinear echo model storage unit 17, the nonlinear echo estimation unit 18, the nonlinear echo suppression unit 19, the echo suppressor 20, the inverse fast Fourier transform unit 21, and a correction unit 25.

The correction unit 25 calculates a variable gain for minimizing an output signal of the nonlinear echo suppression unit 19 and corrects a nonlinear echo signal estimated by the nonlinear echo estimation unit 18 by using the calculated variable gain. At this time, the correction unit 25 calculates a variable gain such that the output signal of the nonlinear echo suppression unit 19 nears 0. Then, the correction unit 25 multiplies the nonlinear echo signal estimated by the nonlinear echo estimation unit 18 by the calculated variable gain. In this manner, the correction unit 25 corrects an estimation error of the nonlinear echo signal estimated by the nonlinear echo estimation unit 18.

As operation of the echo suppression device 1E in the present sixth embodiment, new processing is added between Step S2 and Step S3 shown in FIG. 5. Specifically, in the present sixth embodiment, after the processing of Step S2, the correction unit 25 calculates a variable gain for minimizing an output signal of the nonlinear echo suppression unit 19 and corrects a nonlinear echo signal estimated by the nonlinear echo estimation unit 18 by using the calculated variable gain.

In the present sixth embodiment, since an estimation error of a nonlinear echo signal estimated by the nonlinear echo estimation unit 18 is corrected by using an output signal of the nonlinear echo suppression unit 19, an estimation precision of the nonlinear echo signal can be improved to enable improvement in echo suppression performance. The present sixth embodiment is effective, in particular, in a case where a nonlinear echo model has a fixed value.

The echo suppression devices 1A to 1D in the second to fifth embodiments may be provided with the correction unit 25 of the present sixth embodiment.

Seventh Embodiment

In the first embodiment, a nonlinear echo signal estimated by the nonlinear echo estimation unit 18 is output to the nonlinear echo suppression unit 19. By contrast, in the seventh embodiment, an estimation error of a nonlinear echo signal estimated by the nonlinear echo estimation unit 18 is corrected using an output signal of the echo suppressor 20.

Figure 19:
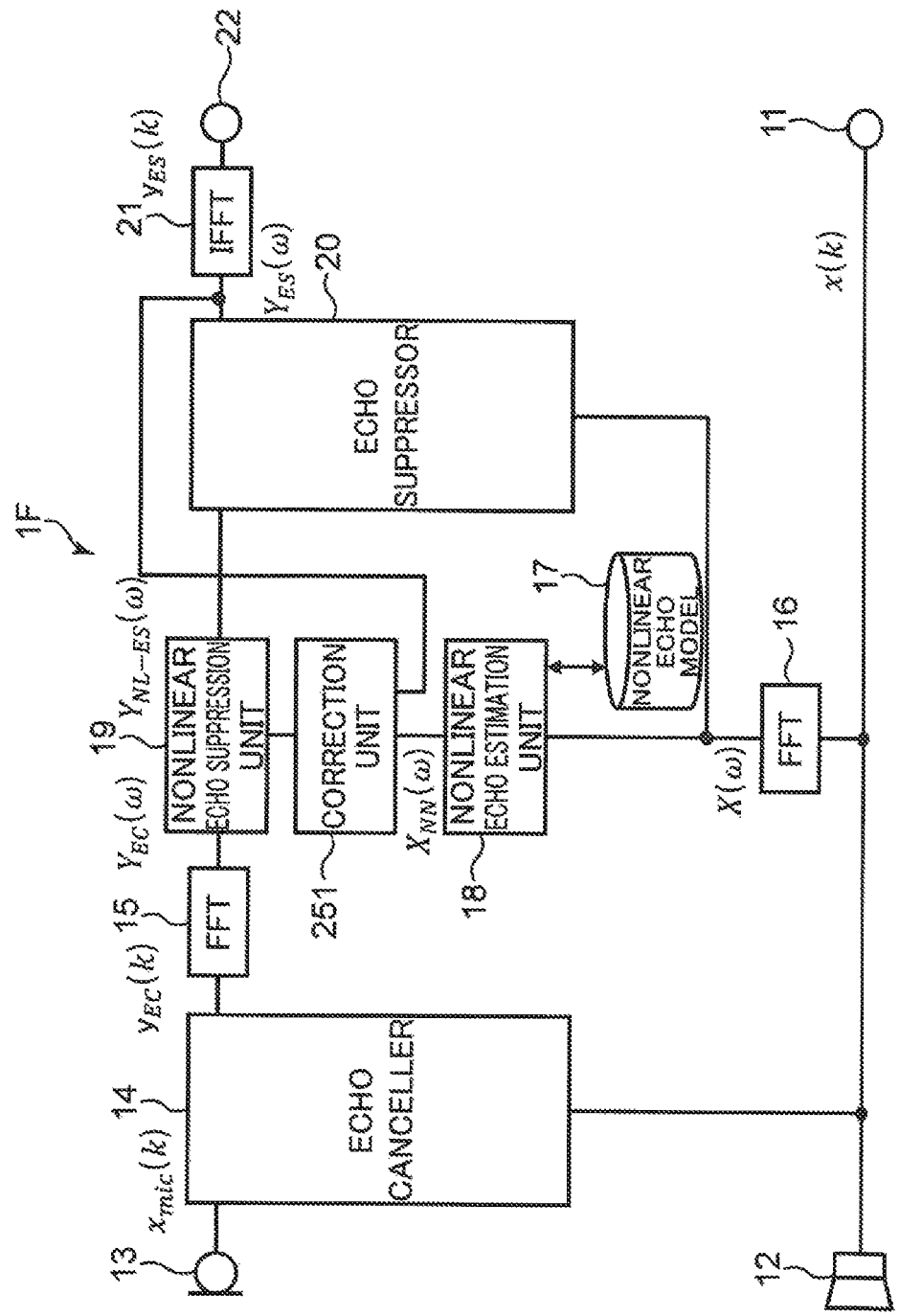
FIG. 19 is a diagram showing a configuration of a call device in a seventh embodiment of the present disclosure.

FIG. 19 is a diagram showing a configuration of a call device in the seventh embodiment of the present disclosure.

The call device shown in FIG. 19 is provided with an echo suppression device 1F, the input terminal 11, the speaker 12, the microphone 13, and the output terminal 22. In the seventh embodiment, the same configuration as that of the first embodiment will be given the same reference sign to omit description thereof.

The echo suppression device 1F is provided with the echo canceller 14, the fast Fourier transform units 15 and 16, the nonlinear echo model storage unit 17, the nonlinear echo estimation unit 18, the nonlinear echo suppression unit 19, the echo suppressor 20, the inverse fast Fourier transform unit 21, and a correction unit 251.

The correction unit 251 calculates a variable gain for minimizing an output signal of the echo suppressor 20 and corrects a nonlinear echo signal estimated by the nonlinear echo estimation unit 18 by using the calculated variable gain. At this time, the correction unit 25 calculates a variable gain such that the output signal of the echo suppressor 20 nears 0. Then, the correction unit 251 multiplies the nonlinear echo signal estimated by the nonlinear echo estimation unit 18 by the calculated variable gain. In this manner, the correction unit 251 corrects an estimation error of the nonlinear echo signal estimated by the nonlinear echo estimation unit 18.

As operation of the echo suppression device 1F in the present seventh embodiment, new processing is added between Step S2 and Step S3 shown in FIG. 5. Specifically, in the present seventh embodiment, after the processing of Step S2, the correction unit 251 calculates a variable gain for minimizing an output signal of the echo suppressor 20 and corrects a nonlinear echo signal estimated by the nonlinear echo estimation unit 18 by using the calculated variable gain.

In the present seventh embodiment, since an estimation error of a nonlinear echo signal estimated by the nonlinear echo estimation unit 18 is corrected by using an output signal of the echo suppressor 20, an estimation precision of the nonlinear echo signal can be improved to enable improvement in echo suppression performance. The present seventh embodiment is effective, in particular, in a case where a nonlinear echo model has a fixed value.

The echo suppression devices 1A to 1D in the second to fifth embodiments may be provided with the correction unit 251 of the present seventh embodiment.

In each of the above-described embodiments, each component may be configured by dedicated hardware or realized by execution of a software program suitable for each component. Each component may have a program execution unit such as a CPU or a processor realized by reading and execution of a software program recorded in a recording medium such as a hard disk or a semiconductor memory.

A part or all of the functions of the devices according to the embodiments of the present disclosure are realized by LSIs (Large Scale Integration), typically integrated circuits. These may be individually formed into one chip, or may be formed into one chip so as to be partly or entirely included. Additionally, an integrated circuit is not limited to an LSI but may be realized as a dedicated circuit or a general-purpose processor. It is possible to use an FPGA (Field Programmable Gate Array) programmable after manufacturing of an LSI, or a reconfigurable processor in which connection or setting of a circuit cell in an LSI can be reconfigured.

Additionally, a part or all of the functions of the devices according to the embodiments of the present disclosure can be realized by execution of a program by a processor such as a CPU.

The numerals used in the foregoing are all examples for specifically describing the present disclosure, and the present disclosure is not limited to the exemplified numerals.

The order of execution of each step shown in the above-described flow chart is an example for specifically describing the present disclosure, and other order may be used within a range where the same effect can be obtained. Additionally, a part of the above-described steps may be executed simultaneously (in parallel) with other steps.

Since the technique of the present disclosure enables stable suppression of a nonlinear echo signal included in an input signal acquired by a microphone, the technique is useful for suppressing a linear echo signal and a nonlinear echo signal included in the input signal acquired by the microphone.

This application is based on U.S. Provisional application No. 62/934,119 flied in United States Patent and Trademark Office on Nov. 12, 2019 and Japanese Patent application No. 2020-087944 filed in Japan Patent Office on May 20, 2020, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An echo suppression device comprising:
a first linear echo suppression unit which estimates an amplitude component and a phase component of a linear echo signal included in an input signal acquired by a microphone, to suppress the linear echo signal from the input signal;
a nonlinear echo estimation unit which, by using a nonlinear echo model indicative of a relationship between at least one of a call reception signal to be output to a speaker and the input signal, and a nonlinear echo signal, estimates the nonlinear echo signal included in the input signal from at least one of the call reception signal and the input signal;
a nonlinear echo suppression unit which, by using the nonlinear echo signal estimated by the nonlinear echo estimation unit, suppresses the nonlinear echo signal from an output signal of the first linear echo suppression unit; and
a second linear echo suppression unit which estimates an amplitude component of a residual linear echo signal not suppressed by the first linear echo suppression unit, to suppress the residual linear echo signal from an output signal of the nonlinear echo suppression unit.

2. The echo suppression device according to claim 1, wherein the nonlinear echo model is learned with at least one of the call reception signal and the input signal as an input and the nonlinear echo signal as an output, the nonlinear echo model using, as teacher data, at least one of the call reception signal and the input signal, and an output signal of the second linear echo suppression unit which suppresses the residual linear echo signal from an output signal of the first linear echo suppression unit which suppresses a linear echo signal from the input signal.

3. The echo suppression device according to claim 1, wherein the nonlinear echo model is a neural network.

4. The echo suppression device according to claim 1, wherein the nonlinear echo estimation unit estimates the nonlinear echo signal included in the input signal from the call reception signal by using the nonlinear echo model indicative of a relationship between the call reception signal and the nonlinear echo signal.

5. The echo suppression device according to claim 1, wherein the nonlinear echo estimation unit estimates the nonlinear echo signal included in the input signal from the call reception signal and the input signal by using the nonlinear echo model indicative of a relationship between the call reception signal and the input signal, and the nonlinear echo signal.

6. The echo suppression device according to claim 1, wherein the nonlinear echo estimation unit estimates the nonlinear echo signal included in the input signal from the call reception signal and an output signal of the first linear echo suppression unit by using the nonlinear echo model indicative of a relationship between the call reception signal and an output signal of the first linear echo suppression unit, and the nonlinear echo signal.

7. The echo suppression device according to claim 1, wherein
the first linear echo suppression unit includes an adaptive filter which generates a pseudo linear echo signal indicative of a component of the call reception signal included in the input signal by convoluting a filtering coefficient and the call reception signal, and a subtraction unit which subtracts the pseudo linear echo signal from the input signal, and
the nonlinear echo estimation unit estimates the nonlinear echo signal included in the input signal from the call reception signal and the pseudo linear echo signal from the adaptive filter by using the nonlinear echo model indicative of a relationship between the call reception signal and the pseudo linear echo signal from the adaptive filter, and the nonlinear echo signal.

8. The echo suppression device according to claim 1, wherein the nonlinear echo estimation unit estimates the nonlinear echo signal included in the input signal from the input signal by using the nonlinear echo model indicative of a relationship between the input signal and the nonlinear echo signal.

9. The echo suppression device according to claim 1, further comprising:
a correction unit which calculates a variable gain for minimizing one of an output signal of the nonlinear echo suppression unit and an output signal of the second linear echo suppression unit, and corrects the nonlinear echo signal estimated by the nonlinear echo estimation unit by using the calculated variable gain.

10. An echo suppression device comprising:
a first linear echo suppression unit which estimates an amplitude component and a phase component of a linear echo signal included in an input signal acquired by a microphone, to suppress the linear echo signal from the input signal;
a nonlinear echo estimation unit which estimates the nonlinear echo signal included in the input signal from at least one of a call reception signal to be output to a speaker and the input signal;
a nonlinear echo suppression unit which, by using the nonlinear echo signal estimated by the nonlinear echo estimation unit, suppresses the nonlinear echo signal from the input signal; and
a second linear echo suppression unit which estimates an amplitude component of a residual linear echo signal not suppressed by the first linear echo suppression unit, to suppress the residual linear echo signal.

11. An echo suppression method comprising:
estimating, by a first linear echo suppression unit, an amplitude component and a phase component of a linear echo signal included in an input signal acquired by a microphone, to suppress the linear echo signal from the input signal;
by using a nonlinear echo model indicative of a relationship between at least one of a call reception signal to be output to a speaker and the input signal, and a nonlinear echo signal, estimating, by a nonlinear echo estimation unit, the nonlinear echo signal included in the input signal from at least one of the call reception signal and the input signal;
by using the nonlinear echo signal estimated by the nonlinear echo estimation unit, suppressing, by a nonlinear echo suppression unit, the nonlinear echo signal from an output signal of the first linear echo suppression unit; and
estimating, by a second linear echo suppression unit, an amplitude component of a residual linear echo signal not suppressed by the first linear echo suppression unit, to suppress the residual linear echo signal from an output signal of the nonlinear echo suppression unit.

12. An echo suppression method comprising:
estimating, by a first linear echo suppression unit, an amplitude component and a phase component of a linear echo signal included in an input signal acquired by a microphone, to suppress the linear echo signal from the input signal;
estimating, by a nonlinear echo estimation unit, the nonlinear echo signal included in the input signal from at least one of a call reception signal to be output to a speaker and the input signal;
by using the nonlinear echo signal estimated by the nonlinear echo estimation unit, suppressing, by a nonlinear echo suppression unit, the nonlinear echo signal from the input signal; and
mating, by a second linear echo suppression unit, an amplitude component of a residual linear echo signal not suppressed by the first linear echo suppression unit, to suppress the residual linear echo signal.

13. A non-transitory computer-readable recording medium which records an echo suppression program, the program causing a computer to function as:
a first linear echo suppression unit which estimates an amplitude component and a phase component of a linear echo signal included in an input signal acquired by a microphone, to suppress the linear echo signal from the input signal;
a nonlinear echo estimation unit which, by using a nonlinear echo model indicative of a relationship between at least one of a call reception signal to be output to a speaker and the input signal, and a nonlinear echo signal, estimates the, nonlinear echo signal included in the input signal from at least one of the call reception signal and the input signal;

a nonlinear echo suppression unit which, by using the nonlinear echo signal estimated by the nonlinear echo estimation unit, suppresses the nonlinear echo signal from an output signal of the first linear echo suppression unit; and a second linear echo suppression unit which estimates an amplitude component of a residual linear echo signal not suppressed by the first linear echo suppression unit, to suppress the residual linear echo signal from an output signal of the nonlinear echo suppression unit.

14. A non-transitory computer-readable recording medium which records an echo suppression program, the program causing a computer to function as:

a first linear echo suppression unit which estimates an amplitude component and a phase component of a linear echo signal included in an input signal acquired by a microphone, to suppress the linear echo signal from the input signal;

a nonlinear echo estimation unit which estimates the nonlinear echo signal included in the input signal from at least one of a rail reception signal to be output to a speaker and the input signal;

a nonlinear echo suppression unit which, by using the nonlinear echo signal estimated by the nonlinear echo estimation unit, suppresses the nonlinear echo signal from the input signal; and a second linear echo suppression unit which estimates an amplitude component of a residual linear echo signal not suppressed by the first linear echo suppression unit, to suppress the residual linear echo signal.

* * * * *